United States Patent
Yamamoto et al.

(10) Patent No.: US 10,351,209 B2
(45) Date of Patent: Jul. 16, 2019

(54) BICYCLE SHIFTING DEVICE AND BICYCLE ASSIST SYSTEM INCLUDING BICYCLE SHIFTING DEVICE

(71) Applicant: Shimano Inc., Sakai, Osaka (JP)

(72) Inventors: Takashi Yamamoto, Osaka (JP); Hiroyuki Urabe, Osaka (JP); Kai Ikeda, Osaka (JP)

(73) Assignee: Shimano Inc., Osaka (JP)

( * ) Notice: Subject to any disclaimer, the term of this patent is extended or adjusted under 35 U.S.C. 154(b) by 3 days.

(21) Appl. No.: 15/897,491

(22) Filed: Feb. 15, 2018

(65) Prior Publication Data

US 2018/0237105 A1   Aug. 23, 2018

(30) Foreign Application Priority Data

Feb. 23, 2017 (JP) .................... 2017-032603
Nov. 13, 2017 (JP) .................... 2017-218448

(51) Int. Cl.
*B62M 11/16* (2006.01)
*F16H 3/66* (2006.01)
(Continued)

(52) U.S. Cl.
CPC ............. *B62M 11/16* (2013.01); *B62M 6/55* (2013.01); *B62M 11/18* (2013.01); *F16H 3/62* (2013.01); *F16H 3/66* (2013.01); *F16H 2063/3093* (2013.01); *F16H 2200/0039* (2013.01); *F16H 2200/0043* (2013.01); *F16H 2200/0047* (2013.01); *F16H 2200/2007* (2013.01); *F16H 2200/2012* (2013.01);
(Continued)

(58) Field of Classification Search
CPC ........ B62M 6/55; B62M 11/16; B62M 11/18; F16H 3/62; F16H 3/66
See application file for complete search history.

(56) References Cited

U.S. PATENT DOCUMENTS 6,296,072 B1 * 10/2001 Turner .................... B62M 6/45
180/206.2
2008/0227588 A1 * 9/2008 Urabe .................... B62M 11/18
475/297

(Continued)

FOREIGN PATENT DOCUMENTS

JP          4564978 B2   10/2010

*Primary Examiner* — Edwin A Young
(74) *Attorney, Agent, or Firm* — Global IP Counselors, LLP

(57) ABSTRACT

A bicycle shifting device includes a first shifting mechanism, a transmission mechanism, and a setting mechanism. The setting mechanism sets paths in the transmission mechanism to transmit rotation from an input body to an output body at transmission ratios of at least three steps. The transmission mechanism establishes a first path transmitting the rotation at one of first and second transmission ratios by changing a rotational speed with the first shifting mechanism, and a second path transmitting the rotation at a greater transmission ratio than the first and second transmission ratios by changing the rotational speed with a different shifting mechanism from the first shifting mechanism. The first path includes first and second planetary mechanisms. The setting mechanism sets the transmission mechanism so that the rotational speed is not changed by the first planetary mechanism in the second path.

27 Claims, 17 Drawing Sheets

(51) Int. Cl.
*B62M 6/55* (2010.01)
*B62M 11/18* (2006.01)
*F16H 3/62* (2006.01)
*F16H 63/30* (2006.01)

(52) U.S. Cl.
CPC .............. *F16H 2200/2035* (2013.01); *F16H 2200/2041* (2013.01); *F16H 2200/2069* (2013.01); *F16H 2200/2084* (2013.01)

(56) References Cited

U.S. PATENT DOCUMENTS

| 2013/0252778 A1* | 9/2013 | Samways | B62L 5/00 |
| | | | 475/269 |
| 2014/0121049 A1* | 5/2014 | Nishikawa | B62M 6/55 |
| | | | 474/148 |

* cited by examiner

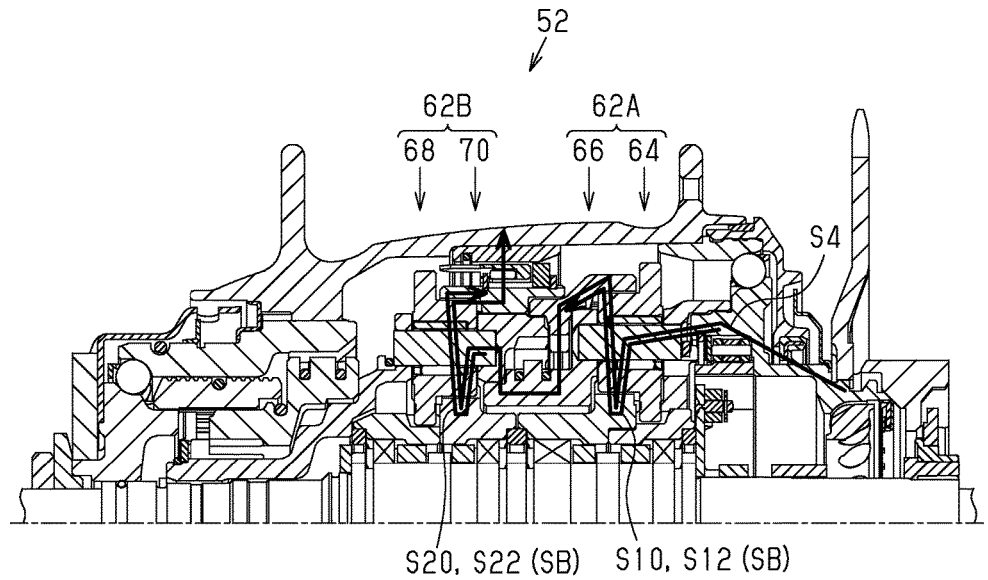

Fig.14

| | | 1st Shifting Path S10 | | |
|---|---|---|---|---|
| | | Not Via ×1 | 1st Planetary Shifting Path S11 ×1.354 | 2nd Planetary Shifting Path S12 ×1.611 |
| 2nd Shifting Path S20 | Not Via ×1 | Minimum Transmission Ratio T0 ×1 (1st Speed Stage) | 1st Increase Ratio T1 ×1.354 (2nd Speed Stage) | ×1.611 |
| | 3rd Planetary Shifting Path S21 ×1.291 | ×1.291 | 2nd Increase Ratio T2 ×1.748 (3rd Speed Stage) | ×2.08 |
| | 4th Planetary Shifting Path S22 ×1.611 | ×1.611 | 3rd Increase Ratio T3 ×2.181 (4th Speed Stage) | 4th Increase Ratio T4 ×2.596 (5th Speed Stage) |

Fig.15

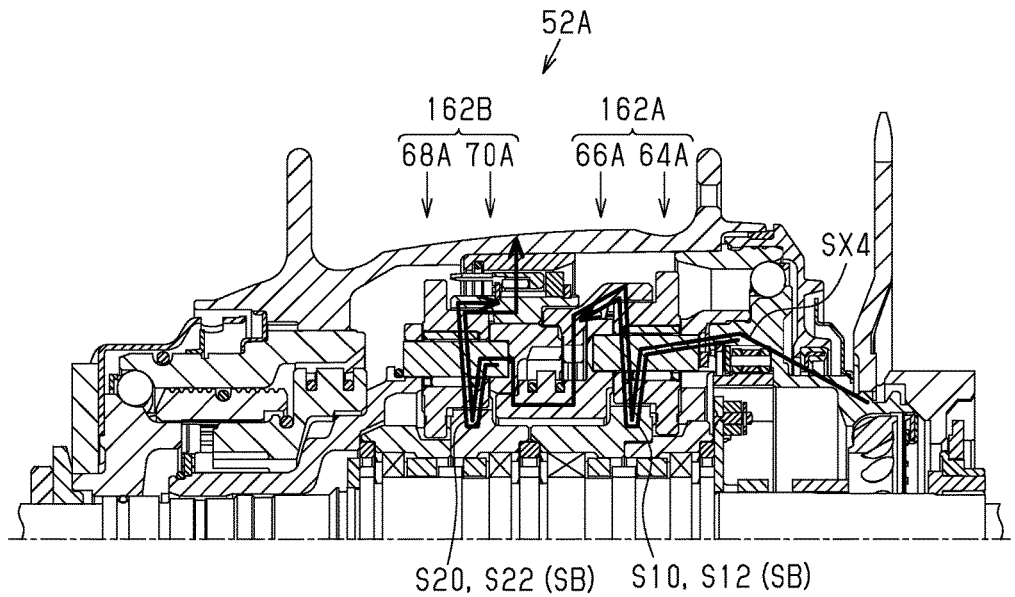

Fig.26

| | | 1st Shifting Path S10 | | |
|---|---|---|---|---|
| | | Not Via ×1 | 1st Planetary Shifting Path S11 ×1.277 | 2nd Planetary Shifting Path S12 ×1.622 |
| 2nd Shifting Path S20 | Not Via ×1 | Minimum Transmission Ratio R0 ×1 (1st Speed Stage) | 1st Increase Ratio R1 ×1.277 (2nd Speed Stage) | 2nd Increase Ratio R2 ×1.622 (3rd Speed Stage) |
| | 3rd Planetary Shifting Path S21 ×1.277 | ×1.277 | ×1.63 | 3rd Increase Ratio R3 ×2.07 (4th Speed Stage) |
| | 4th Planetary Shifting Path S22 ×1.622 | ×1.622 | ×2.07 | 4th Increase Ratio R4 ×2.63 (5th Speed Stage) |

Fig.27

BICYCLE SHIFTING DEVICE AND BICYCLE ASSIST SYSTEM INCLUDING BICYCLE SHIFTING DEVICE

CROSS-REFERENCE TO RELATED APPLICATIONS

This application claims priority to Japanese Patent Application No. 2017-032603, filed on Feb. 23, 2017, and Japanese Patent Application No. 2017-218448, filed on Nov. 13, 2017. The entire disclosures of Japanese Patent Application Nos. 2017-032603 and 2017-218448 are hereby incorporated herein by reference.

BACKGROUND

Field of the Invention

The present invention generally relates to a bicycle shifting device and a bicycle assist system including a bicycle shifting device.

Background Information

An example of a bicycle shifting device is disclosed in Japanese Patent No. 4564978 (patent document 1) includes an internal shifting device changing the transmission ratio of a bicycle in a stepped manner. The internal shifting device includes a first planetary gear mechanism, a second planetary gear mechanism, a third planetary gear mechanism and a fourth planetary gear mechanism. In a case of increasing the transmission ratio, for example, from the second transmission ratio to the third transmission ratio, the bicycle shifting device shifts from a state where the shifting is performed using the sun gear of the first planetary gear mechanism to a state where the shifting is performed using the sun gear of the second planetary gear mechanism. In a case of further increasing the transmission ratio from the third transmission ratio to the fourth transmission ratio, the bicycle shifting device shifts from the state where the shifting is performed using the sun gear of the second planetary gear mechanism to a state where the shifting is performed using the sun gear of the first planetary gear mechanism. At the same time, a state where rotation is transmitted from the first and second planetary gear mechanisms to the output body and a state where rotation is transmitted from the third and fourth planetary gear mechanisms to the output body are switched.

SUMMARY

One object of the present invention is to provide a bicycle shifting device configured to appropriately change the transmission ratio and a bicycle assist system including the shifting device.

A first aspect of the present invention is a bicycle shifting device changing speed of rotation of an input body and transmitting the rotation to an output body. The bicycle shifting device includes a plurality of shifting mechanisms, a transmission mechanism and a setting mechanism. The plurality of shifting mechanisms is configured to change a rotational speed transmitted from the input body to the output body. The transmission mechanism is configured to transmit rotation from the input body to the output body at transmission ratios of at least three steps. The setting mechanism configured to set a plurality of shifting paths in the transmission mechanism to selectively establish the transmission ratios. The plurality of shifting mechanisms includes at least a first shifting mechanism. The first shifting mechanism includes a first planetary mechanism and a second planetary mechanism. The transmission mechanism establishes at least a first shifting path and a second shifting path. The first shifting path transmits rotation from the input body to the output body at one of a first transmission ratio and a second transmission ratio by changing the rotational speed with at least the first shifting mechanism. The second shifting path transmits rotation from the input body to the output body at a transmission ratio that is greater than the first and second transmission ratios by changing the rotational speed with one of the plurality of shifting mechanisms differing from the shifting mechanism used to establish the first shifting path. The first shifting path includes a first planetary shifting path transmitting the rotation from the input body to the output body at the first transmission ratio by changing the rotational speed with the first planetary mechanism and not with the second planetary mechanism. The second planetary shifting path transmitting the rotation from the input body to the output body at the second transmission ratio by changing the rotational speed not with the first planetary mechanism but with the second planetary mechanism. The setting mechanism is configured to set the transmission mechanism so that the rotational speed is not changed by the first planetary mechanism in the second shifting path. In a case of increasing the transmission ratio in a stepped manner, a prior art bicycle shifting device has a step that changes from a sun gear having a small number of teeth to a sun gear having a large number of teeth and a step that changes from the sun gear having a large number of teeth to the sun gear having a small number of teeth. Thus, the configuration of the shifting paths is complicated. With the configuration of the first aspect, the rotational speed is not changed by the first planetary mechanism in a second shifting path that transmits the rotation to the output body at a greater transmission ratio than the second transmission ratio. Thus, as compared to a case where the rotational speed is changed again by the first planetary mechanism in the path obtaining a greater transmission ratio than the second transmission ratio, the configuration of the shifting paths is simplified. Hence, the transmission ratio is appropriately changed.

In accordance with a second aspect of the present invention, the bicycle shifting device according to the first aspect is configured so that each of the first and second planetary mechanisms is configured to increase the rotational speed transmitted from the input body to the output body. With the above configuration, the rotational speed from the input body can be increased by one of the first planetary mechanism and the second planetary mechanism, and the rotation is output.

In accordance with a third aspect of the present invention, the bicycle shifting device according to the first or second aspect is configured so that the plurality of shifting mechanisms further includes a second shifting mechanism that at least partially establishes the second shifting path. The second shifting mechanism includes a third planetary mechanism and a fourth planetary mechanism. The second shifting path includes a third planetary shifting path and a fourth planetary shifting path. The third planetary shifting path transmits the rotation from the input body to the output body at a third transmission ratio, which is greater than the second transmission ratio, by changing the rotational speed of with the third planetary mechanism and not with the fourth planetary mechanism. The fourth planetary shifting path transmits the rotation from the input body to the output body at a fourth transmission ratio, which is greater than the third transmission ratio, by changing the rotational speed not with the third planetary mechanism but with the fourth planetary mechanism. The setting mechanism is configured to set the shifting paths so that the rotational speed is not changed by the third planetary mechanism in one of the shifting paths corresponding to a transmission ratio that is greater than the fourth transmission ratio. With the above configuration, the rotational speed is not changed by the third planetary mechanism in a shifting path transmitting the rotation to the output body at a greater transmission ratio than the fourth transmission ratio. Thus, as compared to a case where the rotational speed is changed again by the third planetary mechanism in the path obtaining a greater transmission ratio than the fourth transmission ratio, the configuration of the shifting paths is simplified.

In accordance with a fourth aspect of the present invention, the bicycle shifting device according to the third aspect is configured so that the third planetary mechanism is configured to increase the rotational speed transmitted from the input body to the output body. With the above configuration, the rotational speed from the input body can be increased by the third planetary mechanism, and the rotation is output.

In accordance with a fifth aspect of the present invention, the bicycle shifting device according to the third or fourth aspect is configured so that the fourth planetary mechanism is configured to increase the rotational speed transmitted from the input body to the output body. With the above configuration, the rotational speed of from the input body can be increased by the fourth planetary mechanism, and the rotation is output.

A sixth aspect of the present invention is a bicycle shifting device changing speed of rotation of an input body and transmitting the rotation to an output body. The bicycle shifting device includes a plurality of shifting mechanisms, a transmission mechanism and a setting mechanism. The plurality of shifting mechanisms is configured to change a rotational speed transmitted from the input body to the output body. The transmission mechanism is configured to transmit rotation from the input body to the output body at transmission ratios of at least three steps. The setting mechanism is configured to set a plurality of shifting paths in the transmission mechanism to selectively establish the transmission ratios. Each of the plurality of shifting mechanisms includes at least one planetary mechanism. The transmission mechanism establishes at least a first shifting path and a second shifting path. The first shifting path transmits the rotation from the input body to the output body at a first predetermined transmission ratio by changing the rotational speed with at least one of the plurality of shifting mechanisms. The second shifting path transmits the rotation from the input body to the output body at a second predetermined transmission ratio, which is greater than the first predetermined transmission ratio, by changing the rotational speed of with one of the plurality of shifting mechanisms differing from the least one of the plurality of shifting mechanisms used to establish the first shifting path. In a case where the rotational speed is changed in the second shifting path by the least one of the plurality of shifting mechanisms used to establish the first shifting path, the setting mechanism is configured to set the transmission mechanism so that the rotational speed is changed in one of the shifting paths corresponding to a transmission ratio that is greater than the second predetermined transmission ratio by the least one of the plurality of shifting mechanisms used to establish the first shifting path. With the above configuration, in a shifting path transmitting rotation to the output body at a greater transmission ratio than the second predetermined transmission ratio, the rotational speed is changed by the shifting mechanism that establishes the first shifting path. Thus, in the path obtaining a greater transmission ratio than the second predetermined transmission ratio, the shifting path will not be changed to a shifting path in which the rotational speed is not changed by the shifting mechanism that establishes the first shifting path. Thus, the configuration of the shifting paths is simplified. Hence, the transmission ratio is appropriately changed.

In accordance with a seventh aspect of the present invention, the bicycle shifting device according to the sixth aspect is configured so that the least one of the plurality of shifting mechanisms used to establish the first shifting path includes a first planetary mechanism and a second planetary mechanism. With the above configuration, the first shifting path includes the two planetary mechanisms. This increases the number of transmission ratios that can be realized in the first shifting path.

In accordance with an eighth aspect of the present invention, the bicycle shifting device according to the seventh aspect is configured so that each of the first and second planetary mechanisms is configured to increase the rotational speed transmitted from the input body to the output body. With the above configuration, the rotational speed from the input body can be increased by one of the first planetary mechanism and the second planetary mechanism, and the rotation is output.

In accordance with a ninth aspect of the present invention, the bicycle shifting device according to any one of the first to fifth, seventh, and eighth aspects further includes a support member supporting the first and second planetary mechanisms. The first planetary mechanism includes a first sun gear rotatably supported by the support member, a first ring gear arranged around the first sun gear, and a first planetary gear engaging with the first sun gear and revolvable with respect to the first sun gear and the first ring gear. The second planetary mechanism includes a second sun gear rotatably supported by the support member, a second ring gear arranged around the second sun gear, and a second planetary gear engaging with the second sun gear and revolvable with respect to the second sun gear and the second ring gear. The setting mechanism includes a first setting member and a second setting member. The first setting member is configured to set the first sun gear to one of a rotation state where the first sun gear is rotatable with respect to the support member and a restriction state where the first sun gear is non-rotatable with respect to the support member. The second setting member is configured to set the second sun gear to one of a rotation state where the second sun gear is rotatable with respect to the support member and a restriction state where the second sun gear is non-rotatable with respect to the support member. The setting mechanism is configured to control the first and second setting members so that in a case where one of the first and second sun gears is in the restriction state, the other one of the first and second sun gears is in the rotation state. With the above configuration, only one of the first planetary mechanism and the second planetary mechanism is set to the restriction state by the first and second setting members. This allows for formation of a shifting path extending via only one of the first and second planetary mechanisms.

In accordance with a tenth aspect of the present invention, the bicycle shifting device according to the ninth aspect is configured so that the first and second planetary gears are integrally formed on a first planetary gear member, and the first and second ring gears are integrally formed on a first ring gear member. With the above configuration, the first and second planetary gears are integrally formed on the single first planetary gear member, and the first and second ring gears are integrally formed on the single first ring gear member. This contributes to reduction in the number of components.

In accordance with an eleventh aspect of the present invention, the bicycle shifting device according to the tenth aspect is configured so that the first ring gear member includes a first gear portion that is used as the first and second ring gears. With the above configuration, the first gear portion is used as the first ring gear and the second ring gear. Thus, the structure of the first ring gear member is simplified.

In accordance with a twelfth aspect of the present invention, the bicycle shifting device according to any one of the ninth to eleventh aspects is configured so that in an operation setting the first sun gear from the restriction state to the rotation state with the first setting member and setting the second sun gear from the rotation state to the restriction state with the second setting member, the setting mechanism is configured to set the first sun gear from the restriction state to the rotation state with the first setting member after setting the second sun gear from the rotation state to the restriction state with the second setting member. In a prior art bicycle shifting device, in a case where the state is changed from where the rotational speed is changed using a sun gear having a small number of teeth to where the rotational speed is changed using a sun gear having a large number of teeth to increase the transmission ratio in a stepped manner, the torque transmitted to the sun gear having a small number of teeth can hinder change in the state of the sun gears. With the configuration of the twelfth aspect, in a case where the first sun gear is set from the restriction state to the rotation state by the first setting member, the second sun gear is set to the restriction state by the second setting member. Thus, the transmission ratio is changed in a state where the force acting between the first setting member and the first sun gear is reduced. Hence, the transmission ratio is appropriately changed.

In accordance with a thirteenth aspect of the present invention, the bicycle shifting device according to any one of the third to fifth aspects further includes a support member supporting the third and fourth planetary mechanisms. The third planetary mechanism includes a third sun gear rotatably supported by the support member, a third ring gear arranged around the third sun gear, and a third planetary gear engaging with the third sun gear and revolvable with respect to the third sun gear and the third ring gear. The fourth planetary mechanism includes a fourth sun gear rotatably supported by the support member, a fourth ring gear arranged around the fourth sun gear, and a fourth planetary gear engaging with the fourth sun gear and revolvable with respect to the fourth sun gear and the fourth ring gear. The setting mechanism includes a third setting member and a fourth setting member. The third setting member is configured to set the third sun gear to one of a rotation state where the third sun gear is rotatable with respect to the support member and a restriction state where the third sun gear is non-rotatable with respect to the support member. The fourth setting member is configured to setting the fourth sun gear to one of a rotation state where the fourth sun gear is rotatable with respect to the support member and a restriction state where the fourth sun gear is non-rotatable with respect to the support member. The setting mechanism is configured to control the third setting member and the fourth setting member so that in a case where one of the third sun gear and the fourth sun gear is in the restriction state, the other one of the third sun gear and the fourth sun gear is in the rotation state. With the above configuration, only one of the third planetary mechanism and the fourth planetary mechanism is set to the restriction state by the third setting member and the fourth setting member. This forms a shifting path extending via only one of the third planetary mechanism and the fourth planetary mechanism.

In accordance with a fourteenth aspect of the present invention, the bicycle shifting device according to the thirteenth aspect is configured so that the third and fourth planetary gears are integrally formed on a second planetary gear member, and the third and fourth ring gears are integrally formed on a second ring gear member. With the above configuration, the third and fourth planetary gears are integrally formed on the single second planetary gear member, and the third and fourth ring gears are integrally formed on the single second ring gear member. This contributes to reduction in the number of components.

In accordance with a fifteenth aspect of the present invention, the bicycle shifting device according to the fourteenth aspect is configured so that the second ring gear member includes a second gear portion that is used as the third and fourth ring gears. With the above configuration, the second gear portion is used as the third and fourth ring gears. Thus, the structure of the second ring gear member is simplified.

In accordance with a sixteenth aspect of the present invention, the bicycle shifting device according to any one of the thirteenth to fifteenth aspects is configured so that in an operation setting the third sun gear from the restriction state to the rotation state with the third setting member and setting the fourth sun gear from the rotation state to the restriction state with the fourth setting member, the setting mechanism is configured set the third sun gear from the restriction state to the rotation state with the third setting member after setting the fourth sun gear from the rotation state to the restriction state with the fourth setting member. With the above configuration, in a case where the third sun gear is set from the restriction state to the rotation state by the third setting member, the fourth sun gear is set to the restriction state by the fourth setting member. Thus, the transmission ratio is changed in a state where the force acting between the third setting member and the third sun gear is reduced. Hence, the transmission ratio is appropriately changed.

A seventeenth aspect of the present invention is a bicycle shifting device changing speed of rotation of an input body and transmitting the rotation to an output body. The bicycle shifting device includes a shifting mechanism, a transmission mechanism and a setting mechanism. The plurality of shifting mechanisms is configured to change a rotational speed transmitted from the input body to the output body. The transmission mechanism is configured to transmit rotation from the input body to the output body at transmission ratios of at least two steps. The setting mechanism is configured to set a shifting path in the transmission mechanism to selectively establish the transmission ratios. The support member supports the shifting mechanism. The shifting mechanism includes a plurality of transmission bodies supported by the support member so as to be set to one of a rotation state, which allows rotation, and a restriction state, which restricts rotation. The plurality of transmission bodies includes a first transmission body and a second transmission body. The shifting path in the transmission mechanism includes a first path transmitting rotation from the input body to the output body by changing the rotational speed with the first transmission body and a second path transmitting rotation from the input body to the output body by changing the rotational speed with the second transmission body at one of the transmission ratios that is one step greater than the first path. In an operation setting the shifting path from the first path to the second path, the setting mechanism is configured to set the first transmission body from the restriction state to the rotation state after setting the second transmission body from the rotation state to the restriction state. With the above configuration, in a case where the first transmission body is set from the restriction state to the rotation state, the second transmission body is set to the restriction state. Thus, the transmission ratio is changed in a state where the force acting on the second transmission body is reduced. Hence, the transmission ratio is appropriately changed.

In accordance with an eighteenth aspect of the present invention, the bicycle shifting device according to the seventeenth aspect is configured so that the shifting mechanism includes a first shifting mechanism that includes a first planetary mechanism and a second planetary mechanism. The first planetary mechanism includes a first sun gear, which is the first transmission body. The second planetary mechanism includes a second sun gear, which is the second transmission body. The setting mechanism includes a first setting member and a second setting member. The first setting member is configured to set the first sun gear to one of the rotation state and the restriction state. The second setting member is configured to set the second sun gear to one of the rotation state and the restriction state. The setting mechanism is configured to control the first and second setting members so that in a case where one of the first and second sun gears is in the restriction state, the other one of the first and second sun gears is in the rotation state. With the above configuration, only one of the first and second planetary mechanisms is set to the restriction state by the first and second setting members. This forms a shifting path extending via only one of the first and second planetary mechanisms. Additionally, in a case where the first sun gear is set from the restriction state to the rotation state by the first setting member, the second sun gear is set to the restriction state by the second setting member. This appropriately reduces the force acting between the first setting member and the first sun gear.

In accordance with a nineteenth aspect of the present invention, the bicycle shifting device according to the seventeenth or eighteenth aspect is configured so that the shifting mechanism includes a second shifting mechanism that includes a third planetary mechanism and a fourth planetary mechanism. The third planetary mechanism includes a third sun gear, which is the first transmission body. The fourth planetary mechanism includes a fourth sun gear, which is the second transmission body. The setting mechanism includes a third setting member and a fourth setting member. The third setting member is configured to set the third sun gear to one of the rotation state and the restriction state. The fourth setting member is configured to set the fourth sun gear to one of the rotation state and the restriction state. The setting mechanism is configured to control the third and fourth setting members so that in a case where one of the third and fourth sun gears is in the restriction state, the other one of the third and fourth sun gears is in the rotation state. With the above configuration, only one of the third and fourth planetary mechanisms is set to the restriction state by the third and fourth setting members. This forms a shifting path extending via only one of the third and fourth planetary mechanisms. Additionally, in a case where the third sun gear is set from the restriction state to the rotation state by the third setting member, the fourth sun gear is set to the restriction state by the fourth setting member. This appropriately reduces the force acting between the third setting member and the third sun gear.

In accordance with a twentieth aspect of the present invention, the bicycle shifting device according to any one of the seventeenth to nineteenth aspects is configured so that the setting mechanism includes a pawl member that is arranged around the support member to be engageable with an inner circumferential portion of the first transmission body. With the above configuration, the engagement of the first transmission body with the pawl member appropriately forms the restriction state of the first transmission body.

In accordance with a twenty-first aspect of the present invention, the bicycle shifting device according to the twentieth aspect is configured so that the inner circumferential portion of the first transmission body has a groove. The pawl member is configured to fit into the groove. With the above configuration, the engagement of the first transmission body with the pawl member further appropriately forms the restriction state of the first transmission body.

In accordance with a twenty-second aspect of the present invention, the bicycle shifting device according to the twentieth or twenty-first aspect is configured so that the setting mechanism is configured to set the first transmission body from the restriction state to the rotation state in a state where torque acting between the pawl member and the first transmission body is less than or equal to a predetermined value. With the above configuration, in a case of setting the first transmission body from the restriction state to the rotation state, the torque acting between the pawl member and the first transmission body is set to be less than or equal to the predetermined value. Thus, the first transmission body is appropriately changed from the restriction state to the rotation state.

In accordance with a twenty-third aspect of the present invention, the bicycle shifting device according to the twenty-second aspect is configured so that the predetermined value is 15 Nm. With the above configuration, in a case of setting the first transmission body from the restriction state to the rotation state, the torque acting between the pawl member and the first transmission body is set to be less than or equal to 15 Nm. Thus, the first transmission body is appropriately changed from the restriction state to the rotation state.

In accordance with a twenty-fourth aspect of the present invention, the bicycle shifting device according to any one of the first to twenty-third aspects is configured so that the transmission mechanism further forms a non-shifting path transmitting the rotation of the input body to the output body without changing the rotational speed of the input body transmitted to the output body. With the above configuration, the non-shifting path is formed. This increases the number of transmission ratios that can be realized by the bicycle shifting device.

In accordance with a twenty-fifth aspect of the present invention, the bicycle shifting device according to any one of the first to twenty-fourth aspects further includes a hub accommodating the transmission mechanism and the setting mechanism. With the above configuration, the configuration of the shifting paths is also simplified in a bicycle shifting device including a hub, that is, an internal transmission hub.

A twenty-sixth aspect of the present invention is a bicycle assist system including the bicycle shifting device according to any one of the first to twenty-fifth aspects and a motor assisting human driving force. With the above configuration, the configuration of the shifting paths is also simplified in a bicycle shifting device installed on a bicycle including a motor assisting human driving force.

In accordance with a twenty-seventh aspect of the present invention, the bicycle assist system according to the twenty-sixth aspect further includes an operation portion operatively coupled to the bicycle shifting device. The bicycle shifting device changes a transmission ratio of a bicycle in accordance with manual operation of the operation portion. With the above configuration, the configuration of the shifting paths is also simplified in a bicycle shifting device installed on a bicycle that changes the transmission ratio in accordance with an operation performed on an operation portion.

The present bicycle shifting device and the bicycle assist system including the shifting device appropriately change the transmission ratio.

BRIEF DESCRIPTION OF THE DRAWINGS

Referring now to the attached drawings which form a part of this original disclosure.

FIG. 14 is a diagram showing a shifting path of the bicycle shifting device shown in FIGS. 2 and 3 that establishes a fifth speed stage.

FIG. 15 is a table showing the shifting path of each speed stage of the bicycle shifting device shown in FIGS. 2 and 3.

FIG. 26 is a diagram showing a shifting path of the bicycle shifting device shown in FIG. 20 that establishes a fifth speed stage.

FIG. 27 is a table showing the shifting path of each speed stage of the bicycle shifting device shown in FIG. 20.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 having a bicycle assist system 40 will now be described with reference to FIGS. 1 to 19 in accordance with a first embodiment.

Figure 1:
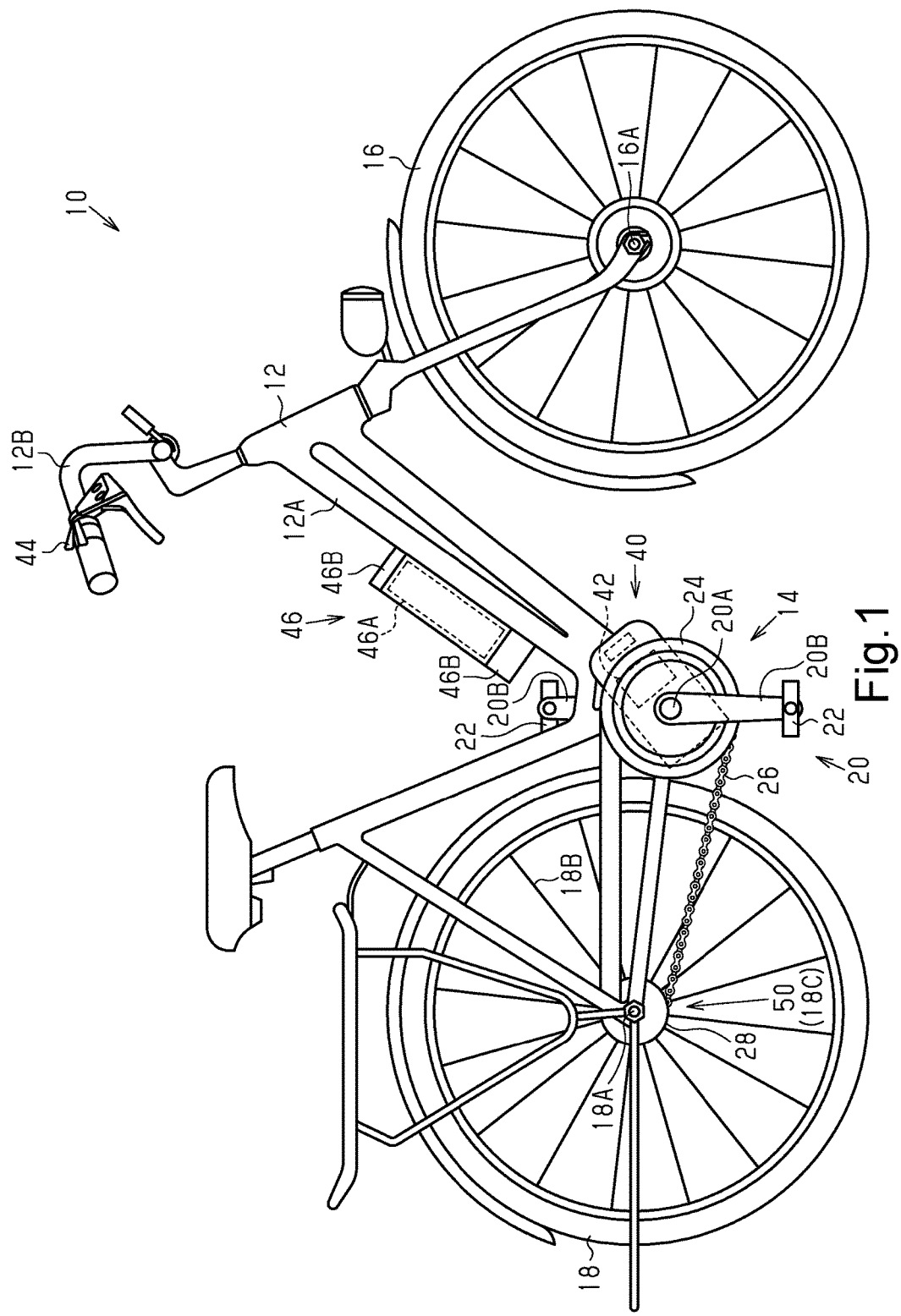
FIG. 1 is a side elevational view of a bicycle having a bicycle assist system in accordance with a first embodiment.

As shown in FIG. 1, the bicycle 10 includes a body 12, a driving mechanism 14, a front wheel 16, a rear wheel 18 and the bicycle assist system 40. The body 12 includes a frame 12A and a handlebar 12B that is coupled to the frame 12A.

The driving mechanism 14 includes a crank 20, a pair of pedals 22, a front rotary body 24, a transmission member 26 and a rear rotary body 28. The crank 20 includes a crankshaft 20A and a pair of crank arms 20B. The driving mechanism 14 transmits human (muscular) driving force, which is applied to the pedals 22, to the rear wheel 18. The front rotary body 24 includes a sprocket, a pulley, or a bevel gear. The rear rotary body 28 includes a sprocket, a pulley, or a bevel gear. The transmission member 26 is configured to transmit rotation of the crank 20 to the rear wheel 18 via, for example, a chain, a belt, or a shaft. The front rotary body 24 is coupled to the crankshaft 20A via a one-way clutch (not shown). The one-way clutch is configured to allow for forward rotation of the front rotary body 24 in a case where the crank 20 is rotated forward and prohibit rearward rotation of the front rotary body 24 in a case where the crank 20 is rotated rearward. The front rotary body 24 can be coupled to the crankshaft 20A without a one-way clutch coupled in between.

The bicycle assist system 40 includes a bicycle shifting device 50 and a motor 42. The bicycle assist system 40 further includes an operation portion 44 and a battery unit 46. The bicycle assist system 40 is installed on the bicycle 10.

The motor 42 assists human driving force. The motor 42 is supported by the frame 12A. In one example, the motor 42 is provided around the crankshaft 20A to transmit torque of the motor 42 to the crankshaft 20A. In another example, the motor 42 is provided around an axle 16A of the front wheel 16 or an axle 18A of the rear wheel 18 to transmit torque of the motor 42 to the front wheel 16 or the rear wheel 18.

The operation portion 44 is manually operated to operate the bicycle shifting device 50. In one example, the operation portion 44 is provided on the handlebar 12B. One end of a Bowden cable (not shown) is coupled to the operation portion 44. The user operates the operation portion 44 to move an inner cable C1 (refer to FIG. 2) of the Bowden cable. The other end of the Bowden cable is coupled to the bicycle shifting device 50. In the illustrated embodiment, the operation portion 44 constitutes a cable operation device, which is a device that pulls and releases a cable. Here, the operation portion 44 can also be considered a shifter.

The battery unit 46 supplies electric power to the motor 42. The battery unit 46 includes a battery cell 46A and a holder 46B configured to attach the battery unit 46 to the frame 12A.

Figure 2:
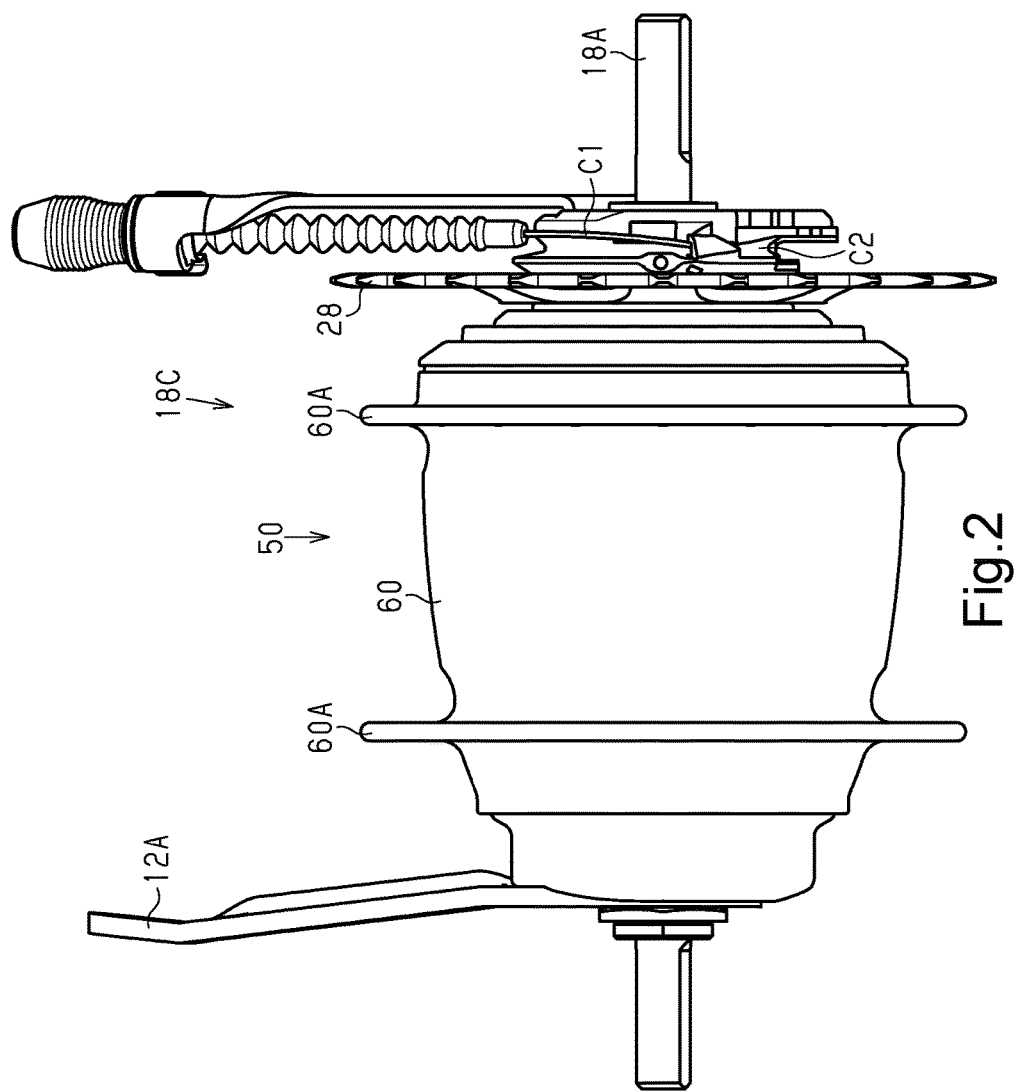
FIG. 2 is a top plan view showing a bicycle shifting device of the bicycle assist system shown in FIG. 1.

The bicycle shifting device 50 changes the transmission ratio of the bicycle 10 in accordance with an operation performed on the operation portion 44. The bicycle shifting device 50 includes a shifting mechanism 62. The shifting mechanism 62 is an internal shifting device. The bicycle shifting device 50 includes a hub 18C. More specifically, as shown in FIG. 2, the bicycle shifting device 50 is an internally geared hub provided integrally with the hub 18C.

Figure 3:
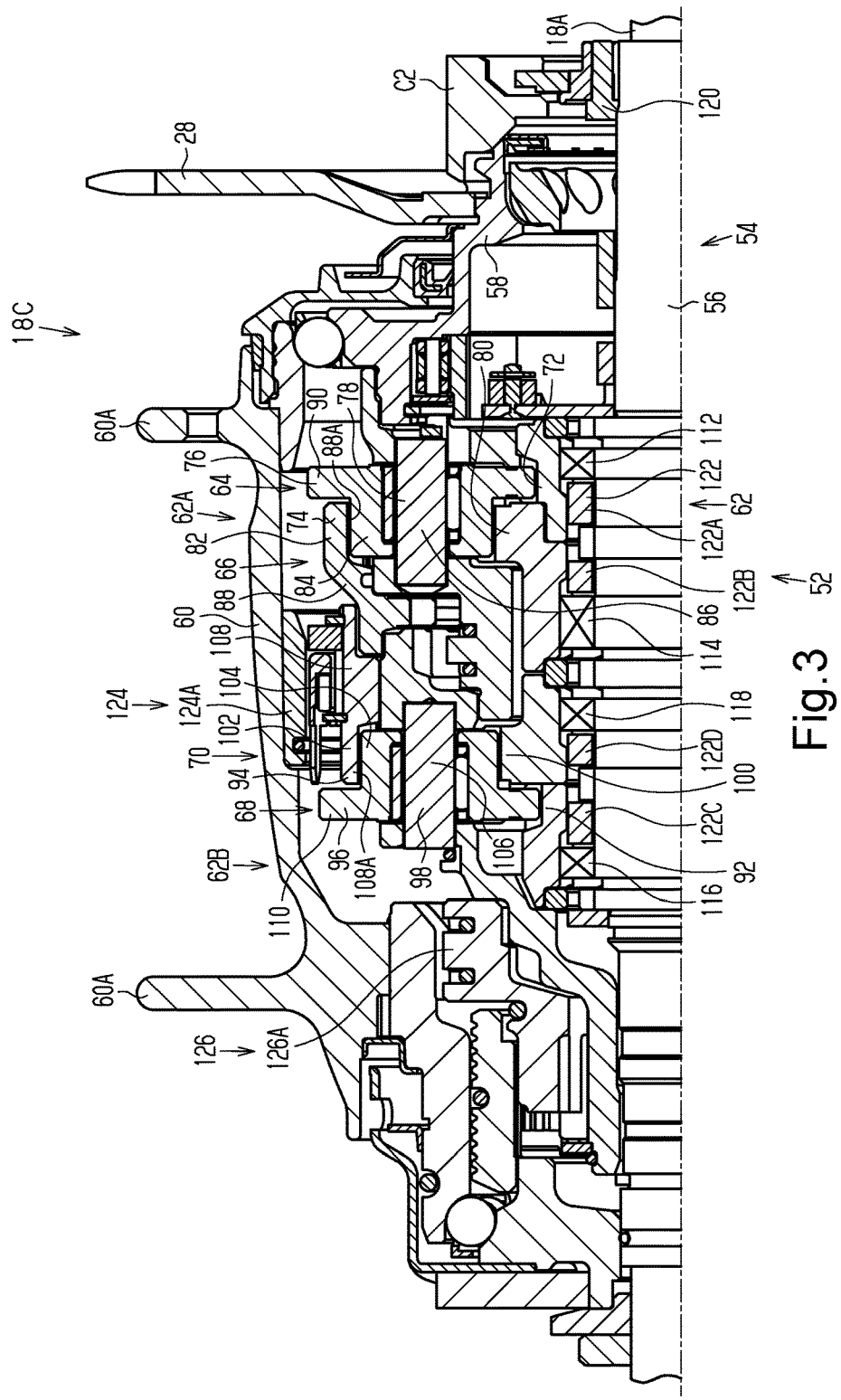
FIG. 3 is a partially cross-sectional view of the bicycle shifting device shown in FIG. 2.

As shown in FIG. 3, the bicycle shifting device 50 is an internal transmission hub. The bicycle shifting device 50 includes a transmission mechanism 52 and a setting mechanism 54. The hub 18C accommodates the transmission mechanism 52 and the setting mechanism 54. The bicycle shifting device 50 further includes a support member 56, an input body 58 and an output body 60. The support member 56 is integrated with the axle 18A of the rear wheel 18. The input body 58 is provided around the support member 56 to be rotatable integrally with the rear rotary body 28. The output body 60 is a hub shell. The output body 60 includes a pair of flanges 60A used to attach spokes 18B of the rear wheel 18. The bicycle shifting device 50 changes the speed of rotation (rotational speed) of the input body 58 and transmits the rotation to the output body 60.

The transmission mechanism 52 includes a plurality of shifting mechanisms 62. The plurality of shifting mechanisms 62 includes at least a first shifting mechanism 62A. The plurality of shifting mechanisms 62 further includes a second shifting mechanism 62B. The transmission mechanism 52 transmits rotation from the input body 58 to the output body 60 at transmission ratios in at least three steps (i.e., three or more steps). The shifting mechanism 62 is configured to change the speed of rotation from the input body 58 and transmit the rotation to the output body 60. More preferably, the shifting mechanism 62 has four or more speed stages that are configured to increase the transmission ratio in a stepped manner. Even more preferably, the shifting mechanism 62 has five or more speed stages that are configured to increase the transmission ratio in a stepped manner. The shifting mechanism 62 that is shown in FIG. 3 has five speed stages.

Each of the plurality of shifting mechanisms 62 includes at least one of planetary mechanisms 64, 66, 68 and 70. The plurality of shifting mechanisms 62 includes a first planetary mechanism 64 and a second planetary mechanism 66. The plurality of shifting mechanisms 62 further includes a third planetary mechanism 68 and a fourth planetary mechanism 70. More specifically, the first shifting mechanism 62A includes the first planetary mechanism 64 and the second planetary mechanism 66. The second shifting mechanism 62B includes the third planetary mechanism 68 and the fourth planetary mechanism 70. The first planetary mechanism 64 is located next to the input body 58 in an axial direction of the bicycle shifting device 50. The second planetary mechanism 66 is located next to the first planetary mechanism 64 at the opposite side of the input body 58 in the axial direction of the bicycle shifting device 50. The fourth planetary mechanism 70 is located next to the second planetary mechanism 66 at the opposite side of the first planetary mechanism 64 in the axial direction of the bicycle shifting device 50. The third planetary mechanism 68 is located next to the fourth planetary mechanism 70 at the opposite side of the second planetary mechanism 66 in the axial direction of the bicycle shifting device 50.

The first planetary mechanism 64 includes a first sun gear 72, a first ring gear 74, at least one first planetary gear 76 and a first carrier 78. The first sun gear 72 is supported by the support member 56 to be rotatable about the axis of the support member 56. The first ring gear 74 is arranged around the first sun gear 72. The first planetary gear 76 engages the first sun gear 72. The first planetary gear 76 is revolvable with respect to the first sun gear 72 and the first ring gear 74. The first planetary mechanism 64 includes a plurality of the first planetary gears 76. The first carrier 78 rotatably supports each of the first planetary gears 76. The first carrier 78 is provided to be rotatable about the axis of the support member 56. Each of the first planetary gears 76 revolves around the first sun gear 72 in accordance with rotation of the first carrier 78. The first carrier 78 is connected to the input body 58 to receive rotation from the input body 58. The first planetary mechanism 64 is configured to increase the speed of rotation (rotational speed) of the input body 58 and output the rotation.

The second planetary mechanism 66 includes a second sun gear 80, a second ring gear 82, at least one second planetary gear 84 and a second carrier 86. The second sun gear 80 is supported by the support member 56 to be rotatable about the axis of the support member 56. The second ring gear 82 is arranged around the second sun gear 80. The second planetary gear 84 engages the second sun gear 80. The second planetary gear 84 is revolvable with respect to the second sun gear 80 and the second ring gear 82. The second planetary mechanism 66 includes a plurality of the second planetary gears 84. The second carrier 86 rotatably supports each of the second planetary gears 84. The second carrier 86 is provided to be rotatable about the axis of the support member 56. Each of the second planetary gears 84 revolves around the second sun gear 80 in accordance with rotation of the second carrier 86. The second planetary mechanism 66 is configured to increase the speed of rotation (rotational speed) from the input body 58 and output the rotation. The second carrier 86 is connected to the input body 58 to receive rotation from the input body 58.

Each of the first and second planetary mechanisms 64 and 66 is configured to increase the speed of rotation (rotational speed) from the input body 58 and output the rotation. The number of teeth of the first sun gear 72 is less than the number of teeth of the second sun gear 80. The number of teeth of each of the first planetary gears 76 is greater than the number of teeth of each of the second planetary gears 84. The number of teeth of the first ring gear 74 is equal to the number of teeth of the second ring gear 82. The first and second ring gears 74 and 82 are formed on a first ring gear member 88. The first ring gear member 88 includes a first gear portion 88A. The first gear portion 88A is used as the first ring gear 74 and the second ring gear 82. The first and second planetary gears 76 and 84 are formed on a first planetary gear member 90. The first planetary gear member 90 includes a so-called stepped planetary gear. The first and second carriers 78 and 86 are formed integrally with each other.

The third planetary mechanism 68 includes a third sun gear 92, a third ring gear 94, at least one third planetary gear 96 and a third carrier 98. The third sun gear 92 is supported by the support member 56 to be rotatable about the axis of the support member 56. The third ring gear 94 is arranged around the third sun gear 92. The third planetary gear 96 engages the third sun gear 92. The third planetary gear 96 is revolvable with respect to the third sun gear 92 and the third ring gear 94. The third planetary mechanism 68 includes a plurality of the third planetary gears 96. The third carrier 98 rotatably supports each of the third planetary gears 96. The third carrier 98 is provided to be rotatable about the axis of the support member 56. Each of the third planetary gears 96 revolves around the third sun gear 92 in accordance with rotation of the third carrier 98. The third carrier 98 is connected to the first ring gear member 88 to receive rotation from the first ring gear member 88.

The fourth planetary mechanism 70 includes a fourth sun gear 100, a fourth ring gear 102, at least one fourth planetary gear 104 and a fourth carrier 106. The fourth sun gear 100 is supported by the support member 56 to be rotatable about the axis of the support member 56. The fourth ring gear 102 is provided around the fourth sun gear 100. The fourth planetary gear 104 engages the fourth sun gear 100. The fourth planetary gear 104 is revolvable with respect to the fourth sun gear 100 and the fourth ring gear 102. The fourth planetary mechanism 70 includes a plurality of the fourth planetary gears 104. The fourth carrier 106 rotatably supports each of the fourth planetary gears 104. The fourth carrier 106 is arranged to be rotatable about the axis of the support member 56. Each of the fourth planetary gears 104 revolves around the fourth sun gear 100 in accordance with rotation of the fourth carrier 106. The fourth carrier 106 is connected to the first ring gear member 88 to receive rotation from the first ring gear member 88.

The third planetary mechanism 68 is configured to increase the speed of rotation (rotational speed) from the input body 58 and output the rotation. The fourth planetary mechanism 70 is configured to increase the speed of rotation (rotational speed) from the input body 58 and output the rotation. The number of teeth of the third sun gear 92 is less than the number of teeth of the fourth sun gear 100. The number of teeth of each of the third planetary gears 96 is greater than the number of teeth of each of the fourth planetary gears 104. The number of teeth of the third ring gear 94 is equal to the number of teeth of the fourth ring gear 102. The third ring gear 94 and the fourth ring gear 102 are formed on a second ring gear member 108. The second ring gear member 108 includes a second gear portion 108A. The second gear portion 108A is used as the third and fourth ring gears 94 and 102. The third and fourth planetary gears 96 and 104 are formed on a second planetary gear member 110. The second planetary gear member 110 includes a so-called stepped planetary gear. The third and fourth carriers 98 and 106 are formed integrally with each other.

The shifting mechanisms 62 include a plurality of transmission bodies (here, sun gears) supported by the support member 56. Each transmission body can be set to one of a rotation state where the transmission body is rotatable and a restriction state where rotation of the transmission body is restricted. The plurality of transmission bodies includes a first transmission body and a second transmission body. In the first shifting mechanism 62A, the first transmission body is the first sun gear 72 and the second transmission body is the second sun gear 80. In the second shifting mechanism 62B, the first transmission body is the third sun gear 92 and the second transmission body is the fourth sun gear 100.

Figure 10:
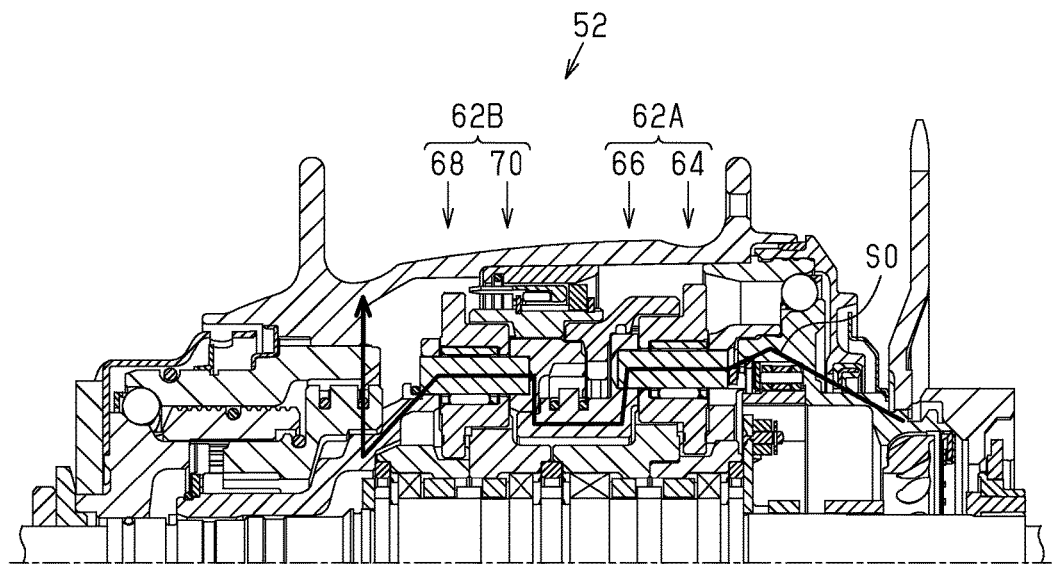
FIG. 10 is a diagram showing a shifting path of the bicycle shifting device shown in FIGS. 2 and 3 that establishes a first speed stage.
Figure 11:
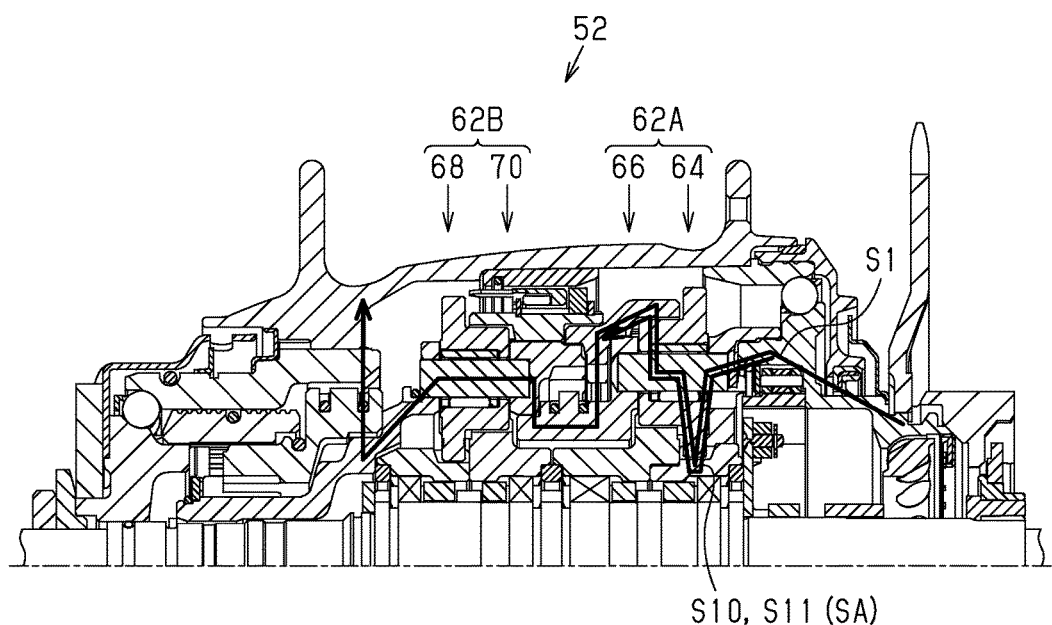
FIG. 11 is a diagram showing a shifting path of the bicycle shifting device shown in FIGS. 2 and 3 that establishes a second speed stage.
Figure 12:
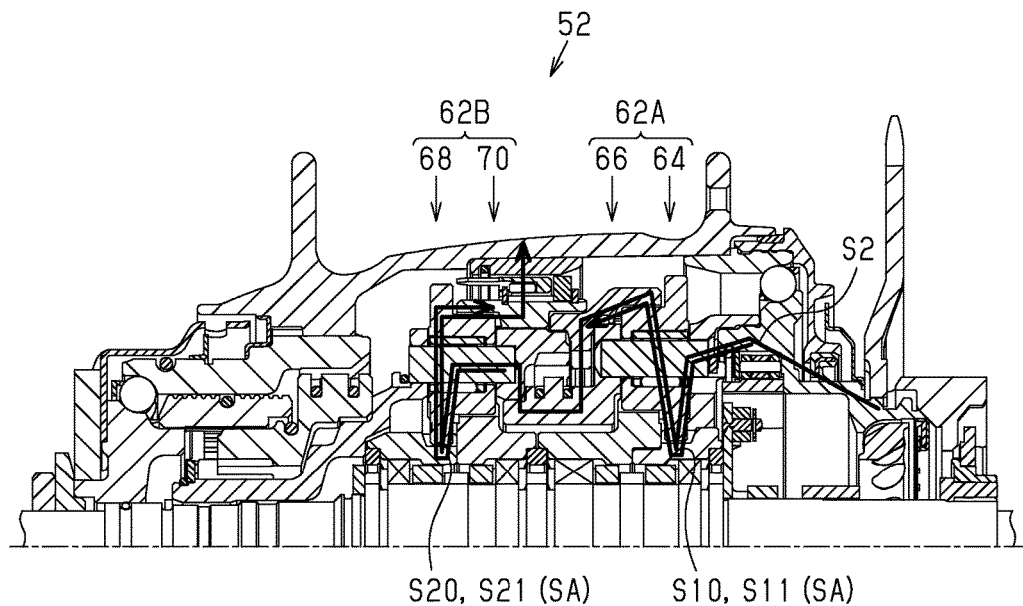
FIG. 12 is a diagram showing a shifting path of the bicycle shifting device shown in FIGS. 2 and 3 that establishes a third speed stage.

The setting mechanism 54 sets a shifting path S of rotation of the input body 58 in the transmission mechanism 52. The setting mechanism 54 sets one of multiple shifting paths S. The multiple shifting paths S include a first shifting path S10 (FIG. 11). The multiple shifting paths S further include a second shifting path S20 (FIG. 12). The transmission mechanism 52 further forms a non-shifting path S0 (FIG. 10), which transmits rotation of the input body 58 to the output body 60 without changing the speed of the rotation.

As shown in FIG. 3, the setting mechanism 54 includes a first setting member 112, a second setting member 114, a third setting member 116, a fourth setting member 118, a control member 120, a sleeve 122, a first switching portion 124 and a second switching portion 126. In this embodiment, each of the first to fourth setting members 112, 114, 116 and 118 is a pawl member that is arranged around the support member 56 to be engageable with an inner circumferential portion of one of the sun gears, which are the transmission bodies. That is, the setting mechanism 54 includes several pawl members that are arranged around the support member 56 to be engageable with one of the inner circumferential portions of the transmission bodies.

The first setting member 112 sets the first sun gear 72 to one of a rotation state where the first sun gear 72 is rotatable with respect to the support member 56 and a restriction state where the first sun gear 72 is not rotatable. The second setting member 114 sets the second sun gear 80 to one of a rotation state where the second sun gear 80 is rotatable with respect to the support member 56 and a restriction state where the second sun gear 80 is not rotatable. The third setting member 116 sets the third sun gear 92 to one of a rotation state where the third sun gear 92 is rotatable with respect to the support member 56 and a restriction state where the third sun gear 92 is not rotatable. The fourth setting member 118 sets the fourth sun gear 100 to one of a rotation state where the fourth sun gear 100 is rotatable with respect to the support member 56 and a restriction state where the fourth sun gear 100 is not rotatable.

The control member 120 is provided around the support member 56 to be rotatable with respect to the support member 56. The control member 120 is connected to a rotary body C2 (refer to FIG. 2), to which an end of the inner cable C1 is connected, to rotate integrally with the rotary body C2. The rotary body C2 rotates in a case where the inner cable C1 is moved by an operation of the operation portion 44 (refer to FIG. 1). The control member 120 also rotates around the support member 56 in accordance with the rotation of the rotary body C2.

Figure 4:
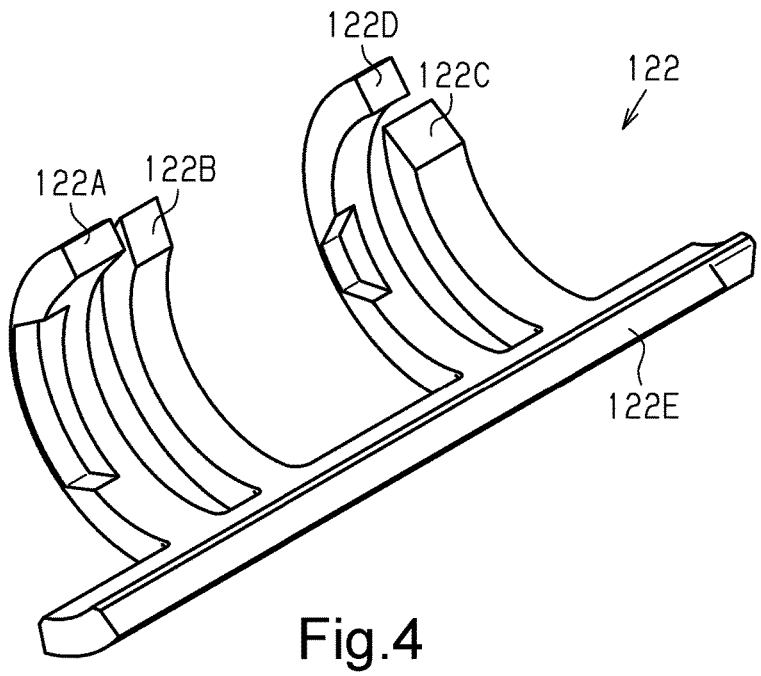
FIG. 4 is a perspective view showing a sleeve of the bicycle shifting device shown in FIGS. 2 and 3.

As shown in FIG. 4, the sleeve 122 includes a first arm portion 122A, a second arm portion 122B, a third arm portion 122C, a fourth arm portion 122D and a base portion 122E. Each of the arm portions 122A to 122D is curved in a circumferential direction of the support member 56. The base portion 122E extends in an axial direction of the support member 56 to connect the arm portions 122A to 122D. The number of the arm portions 122A to 122D is equal to the number of the setting members 112, 114, 116 and 118. An inclined surface is formed on an end portion or an intermediate portion of each of the arm portions 122A to 122D in a direction in which the arm portions 122A to 122D extend. The sleeve 122 is fitted to the control member 120 to rotate integrally with the control member 120 around the support member 56.

Figure 5:
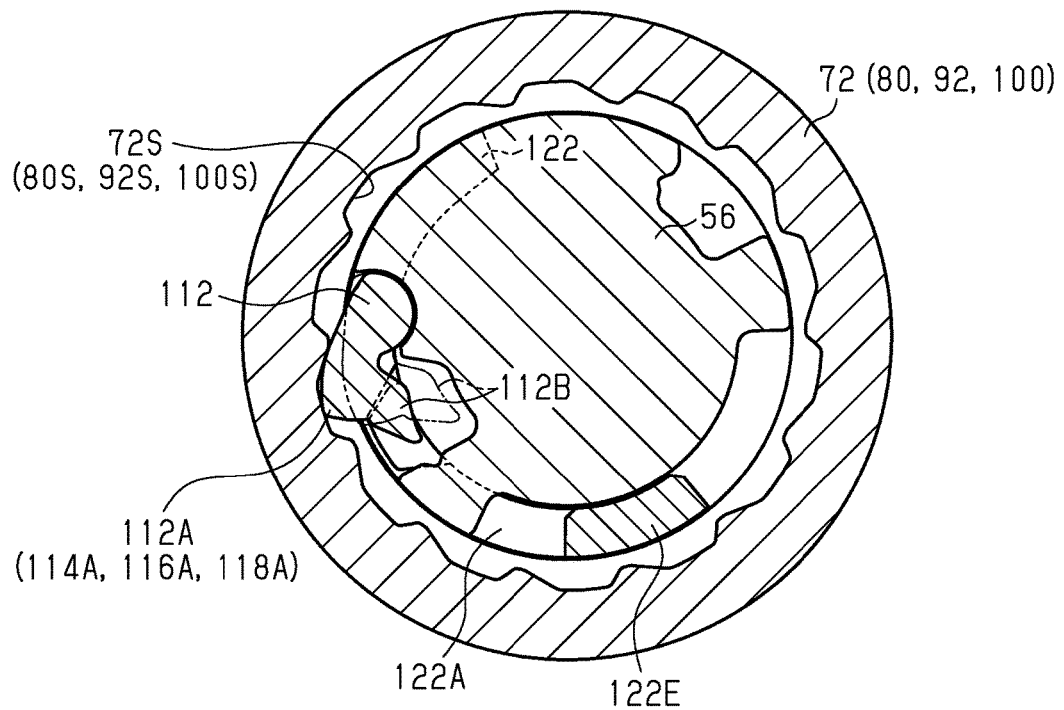
FIG. 5 is a transverse cross-sectional view of selected parts of the bicycle shifting device shown in FIGS. 2 and 3 showing the relationship between the sleeve and a first setting member.
Figure 6:
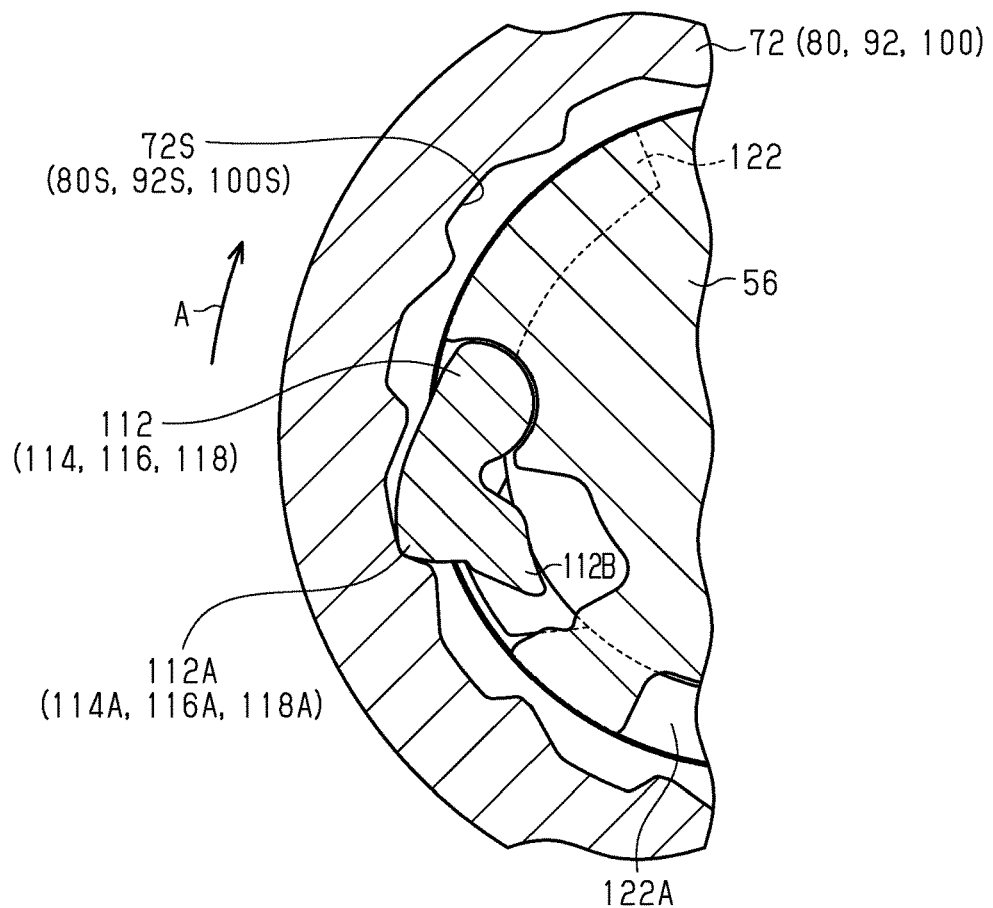
FIG. 6 is an enlarged partial cross-sectional view of the selected parts of the bicycle shifting device shown in FIG. 5 showing a state where the first setting member engages a groove in a first sun gear.
Figure 7:
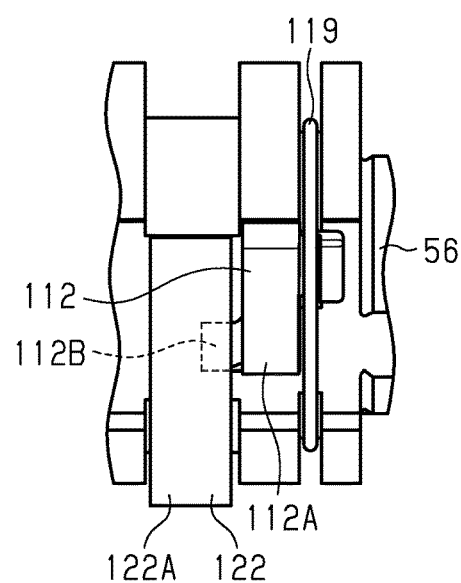
FIG. 7 is a partial elevational view of a pawl member, the sleeve and the first setting member of the bicycle shifting device shown in FIGS. 2 and 3.
Figure 8:
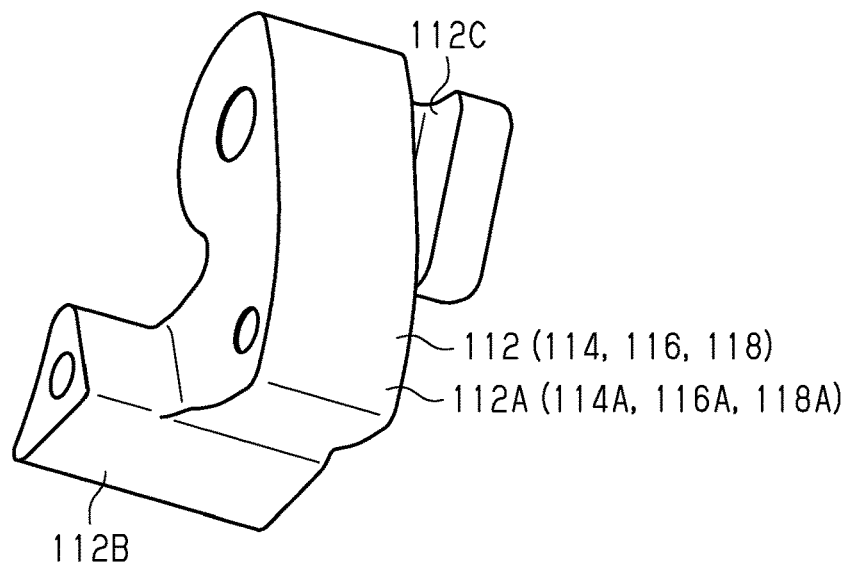
FIG. 8 is a perspective view of the pawl member shown in FIG. 7 used in the bicycle shifting device shown in FIGS. 2 and 3.

As shown in FIGS. 5 to 8, the first setting member 112 is located between the first sun gear 72, which is the first transmission body, and the support member 56. Grooves 72S are formed in the inner circumferential portion of the first sun gear 72, which is the first transmission body, to allow for insertion of the first setting member 112, which is the pawl member. The first setting member 112, which is the pawl member, is arranged around the support member 56 to be engageable with the inner circumferential portion of the first sun gear 72. The first setting member 112, which is the pawl member, includes a pawl portion 112A and an engagement portion 112B engaging with an inner circumferential surface of the first arm portion 122A. In a case where the first arm portion 122A rotates around the support member 56, the engagement portion 112B moves along the inclined surface of the first arm portion 122A, and the first setting member 112 rotates. The state (indicated by solid lines in FIG. 5) where the pawl portion 112A extends toward one of the grooves 72S of the first sun gear 72 (recesses in an inner circumferential portion) forms the restriction state, in which the first sun gear 72 is not rotatable with respect to the support member 56. Hereafter, the state where the pawl portion 112A projects toward a groove 72S is referred to as the first state of the first setting member 112. The state (indicated by double-dashed lines in FIG. 5) where the pawl portion 112A is moved out of the grooves 72S of the first sun gear 72 (recesses in the inner circumferential portion) forms the rotation state, in which the first sun gear 72 is rotatable with respect to the support member 56. Hereafter, the state where the pawl portion 112A is moved out of the grooves 72S is referred to as the second state of the first setting member 112. Hereafter, the position of the first arm portion 122A where the first setting member 112 can form the first state is referred to as the projectable position. Hereafter, the position of the second arm portion 122B where the first setting member 112 is maintained in the second state is referred to as the non-projectable position. In a case where the first arm portion 122A is located in the projectable position, the first setting member 112 can form both the first state and the second state. In a case where the first arm portion 122A is located in the non-projectable position, the first setting member 112 can form only the second state. As shown in FIG. 6, in a state where the first setting member 112 is in the first state and the pawl portion 112A is engaged with one of the grooves 72S, the first setting member 112, which is the pawl member, restricts movement of the first sun gear 72, which is the first transmission body, in a first direction A. Although FIGS. 5 to 8 illustrate the relationship among the first setting member 112, the first sun gear 72 and the first arm portion 122A, the other members also form the rotation state and the restriction state of the sun gears 80, 92 and 100 with similar configurations. The rotation state and the restriction state of the second sun gear 80 are formed by the second setting member 114 and the second arm portion 122B. The rotation state and the restriction state of the third sun gear 92 are formed by the third setting member 116 and the third arm portion 122C. The rotation state and the restriction state of the fourth sun gear 100 are formed by the fourth setting member 118 and the fourth arm portion 122D. The second arm portion 122B moves between a projectable position where the second setting member 114, which is the pawl member, can form the first state and a non-projectable position where the second setting member 114, which is the pawl member, is maintained in the second state. The third arm portion 122C moves between a projectable position where the third setting member 116, which is the pawl member, can form the first state and a non-projectable position where the third setting member 116, which is the pawl member, is maintained in the second state. The fourth arm portion 122D moves between a projectable position where the fourth setting member 118, which is the pawl member, can form the first state and a non-projectable position where the fourth setting member 118, which is the pawl member, is maintained in the second state. In FIGS. 5, 6, and 8, the reference characters of the setting members other than the first setting member 112 and the reference characters of the sun gears other than the first sun gear 72 are shown in parentheses. However, for example, the size and shape of the actual setting members and sun gears can differ from those of the first setting member 112 and the first sun gear 72.

As shown in FIG. 7, the setting mechanism 54 further includes a biasing member 119. The biasing member 119 is provided on each of the first setting member 112, the second setting member 114, the third setting member 116, and the fourth setting member 118 to bias the first setting member 112, the second setting member 114, the third setting member 116 and the fourth setting member 118. The biasing members 119 apply force to the setting members 112, 114, 116 and 118, which are the pawl members, in a direction projecting toward the sun gears 72, 80, 92 and 100, which are the transmission bodies. In other words, the biasing members 119 bias the setting members 112, 114, 116 and 118 toward the first state so that the sun gears 72, 80, 92 and 100 are in the restriction state. The biasing members 119 are, for example, coil springs. As shown in FIG. 8, the biasing member 119 is fitted into a recess 112C, which extends in a circumferential direction of the first setting member 112. The biasing member 119 is wound around the support member 56. The biasing members 119 are provided on the remaining setting members in the same manner.

The setting mechanism 54, which is shown in FIG. 4, controls the first setting member 112 and the second setting member 114 so that if one of the first sun gear 72 and the second sun gear 80 is in the restriction state, the other one of the first sun gear 72 and the second sun gear 80 is in the rotation state. The setting mechanism 54 controls the third setting member 116 and the fourth setting member 118 so that if one of the third sun gear 92 and the fourth sun gear 100 is in the restricted state, the other one of the third sun gear 92 and the fourth sun gear 100 is in the rotation state. In the setting mechanism 54, the inclined surfaces of the arm portions 122A to 122D of the sleeve 122 are located at different positions in the circumferential direction to obtain different rotation phases of the control member 120 at which each of the sun gears 72, 80, 92 and 100 is switched between the rotation state and the restriction state.

The first and second switching portions 124 and 126 form a first state, in which the speed of rotation (rotational speed) of the input body 58 is changed by the second shifting mechanism 62B and the rotation is transmitted to the output body 60, and a second state, in which rotation of the input body 58 is transmitted to the output body 60 without a change in the speed of rotation by the second shifting mechanism 62B.

The first switching portion 124 includes a first one-way clutch 124A. The first one-way clutch 124A is, for example, a roller clutch. The first one-way clutch 124A is located between the second ring gear member 108 and the output body 60. More specifically, the second ring gear member 108 is integrated with an inner race of the first one-way clutch 124A, and an inner circumference of the output body 60 is integrated with an outer race of the first one-way clutch 124A. In a case where the rotational speed of the second ring gear member 108 is lower than the rotational speed of the output body 60, the first one-way clutch 124A allows for relative rotation of the second ring gear member 108 and the output body 60. In a case where the rotational speed of the second ring gear member 108 is higher than or equal to the rotational speed of the output body 60, the first one-way clutch 124A rotates the first ring gear member 88 and the output body 60 integrally with each other.

The second switching portion 126 includes a second one-way clutch 126A. The second one-way clutch 126A is, for example, a one-way clutch having a pawl. The second one-way clutch 126A is located between the third carrier 98 and the output body 60. The second one-way clutch 126A is also located between the fourth carrier 106 and the output body 60. The second one-way clutch 126A transmits rotation of the third carrier 98 and the fourth carrier 106 to the output body 60 but does not transmit rotation of the output body 60 to the third carrier 98 and the fourth carrier 106.

In a case where both of the first sun gear 72 and the second sun gear 80 are in the rotation state and both of the third sun gear 92 and the fourth sun gear 100 are in the rotation state, the speed of rotations that are input to the first planetary mechanism 64, the second planetary mechanism 66, the third planetary mechanism 68, and the fourth planetary mechanism 70 will not be increased. Thus, rotation of the input body 58 is transmitted to the output body 60 via the first switching portion 124 without a change in the speed of the rotation by the first planetary mechanism 64, the second planetary mechanism 66, the third planetary mechanism 68, and the fourth planetary mechanism 70. The rotation of the third carrier 98 and the fourth carrier 106 relative to the output body 60 is allowed by the second switching portion 126.

In a case where one of the first sun gear 72 and the second sun gear 80 is in the restriction state and both of the third sun gear 92 and the fourth sun gear 100 are in the rotation state, the speed of rotations that are input to the third planetary mechanism 68 and the fourth planetary mechanism 70 will not be increased. Thus, the rotation of the input body 58 is transmitted to the output body 60 via the first switching portion 124 without a change in the rotational speed by the third planetary mechanism 68 and the fourth planetary mechanism 70. The rotation of the third carrier 98 and the fourth carrier 106 relative to the output body 60 is allowed by the second switching portion 126.

In a case where one of the first sun gear 72 and the second sun gear 80 is in the restriction state and one of the third sun gear 92 and the fourth sun gear 100 is in the restriction state, the speed of rotation that is input to the third planetary mechanism 68 or the fourth planetary mechanism 70 will be increased. Thus, the rotation of the input body 58 is transmitted to the output body 60 via the second switching portion 126 by changing the rotational speed with the third planetary mechanism 68 or the fourth planetary mechanism 70.

The transmission mechanism 52 forms at least the first shifting path S10 and the second shifting path S20. The first shifting path S10 transmits rotation from the input body 58 to the output body 60 at one of a first transmission ratio and a second transmission ratio, which are included in transmission ratios of three or more steps, by changing the rotational speed with at least the first shifting mechanism 62A. The second shifting path S20 transmits rotation from the input body 58 to the output body 60 at a transmission ratio that is greater than the first transmission ratio and the second transmission ratio by changing the rotational speed with the second shifting mechanism 62B, which differs from the shifting mechanism 62 that establishes the first shifting path S10.

The first shifting path S10 includes a first planetary shifting path S11 and a second planetary shifting path S12. The first planetary shifting path S11 transmits rotation from the input body 58 to the output body 60 at the first transmission ratio by changing the rotational speed with the first planetary mechanism 64 and not with the second planetary mechanism 66. The second planetary shifting path S12 transmits rotation from the input body 58 to the output body 60 at the second transmission ratio by changing the rotational speed not with the first planetary mechanism 64 but with the second planetary mechanism 66.

The setting mechanism 54 sets the transmission mechanism 52 so that the rotational speed is not changed by the first planetary mechanism 64 in the second shifting path S20. The second shifting path S20 includes a third planetary shifting path S21 and a fourth planetary shifting path S22. The third planetary shifting path S21 transmits rotation from the input body 58 to the output body 60 at a third transmission ratio, which is greater than the second transmission ratio, by changing the rotational speed with the third planetary mechanism 68 and not with the fourth planetary mechanism 70. The fourth planetary shifting path S22 transmits rotation from the input body 58 to the output body 60 at a fourth transmission ratio, which is greater than the third transmission ratio, by changing the rotational speed not with the third planetary mechanism 68 but with the fourth planetary mechanism 70.

The first shifting path S10 transmits rotation from the input body 58 to the output body 60 at a first predetermined transmission ratio in transmission ratios of three or more steps by changing the rotational speed with at least one of the shifting mechanisms 62. The second shifting path S20 transmits rotation from the input body 58 to the output body 60 at a second predetermined transmission ratio, which is greater than the first predetermined transmission ratio, by changing the rotational speed with one of the shifting mechanisms 62 differing from the shifting mechanism 62 that establishes the first shifting path S10. In a case where the rotational speed is changed in the second shifting path S20 by the shifting mechanism 62 that establishes the first shifting path S10, the setting mechanism 54 sets the transmission mechanism 52 so that the rotational speed is changed in a shifting path S corresponding to a transmission ratio that is greater than the second predetermined transmission ratio by the shifting mechanism 62 that establishes the first shifting path S10.

The shifting paths S of the transmission mechanism 52 include a first path SA and a second path SB. The first path SA transmits rotation from the input body 58 to the output body 60 by changing the rotational speed with the first transmission body (the first sun gear 72 in the first shifting mechanism 62A and the third sun gear 92 in the second shifting mechanism 62B). The second path SB transmits rotation from the input body 58 to the output body 60 at a transmission ratio that is one step greater than the first path SA by changing the rotational speed with the second transmission body (the second sun gear 80 in the first shifting mechanism 62A and the fourth sun gear 100 in the second shifting mechanism 62B). With regard to the first shifting mechanism 62A, the first path SA corresponds to the first planetary shifting path S11, and the second path SB corresponds to the second planetary shifting path S12. With regard to the second shifting mechanism 62B, the first path SA corresponds to the third planetary shifting path S21, and the second path SB corresponds to the fourth planetary shifting path S22.

The setting mechanism 54 performs a setting operation setting the shifting path S from the first path SA to the second path SB. In the setting operation, the setting mechanism 54 sets the first transmission body from the restriction state to the rotation state and the second transmission body from the rotation state to the restriction state. In the setting operation, after setting the second transmission body from the rotation state to the restriction state, the setting mechanism 54 sets the first transmission body from the restriction state to the rotation state. The setting operation includes a first setting operation performed on the first shifting mechanism 62A and a second setting operation performed on the second shifting mechanism 62B.

In the first setting operation, the setting mechanism 54 sets the first sun gear 72, which is the first transmission body, from the restriction state to the rotation state using the first setting member 112. The setting mechanism 54 also sets the second sun gear 80, which is the second transmission body, from the rotation state to the restriction state using the second setting member 114. In the first setting operation, after setting the second sun gear 80, which is the second transmission body, from the rotation state to the restriction state using the second setting member 114, the setting mechanism 54 sets the first sun gear 72, which is the first transmission body, from the restriction state to the rotation state using the first setting member 112. More specifically, the setting mechanism 54 has the second setting member 114 set the second sun gear 80 from the rotation state to the restriction state by moving the second arm portion 122B from the rotatable position to the non-rotatable position. The setting mechanism 54 has the first setting member 112 set the first sun gear 72 from the restriction state to the rotation state by moving the first arm portion 122A from the non-rotatable position to the rotatable position.

In the second setting operation, the setting mechanism 54 sets the third sun gear 92, which is the first transmission body, from the restriction state to the rotation state using the third setting member 116. The setting mechanism 54 also sets the fourth sun gear 100, which is the second transmission body, from the rotation state to the restriction state using the fourth setting member 118. In the second setting operation, after setting the fourth sun gear 100, which is the second transmission body, from the rotation state to the restriction state using the fourth setting member 118, the setting mechanism 54 sets the third sun gear 92, which is the first transmission body, from the restriction state to the rotation state using the third setting member 116. More specifically, the setting mechanism 54 has the fourth setting member 118 set the fourth sun gear 100 from the rotation state to the restriction state by moving the fourth arm portion 122D from the rotatable position to the non-rotatable position. The setting mechanism 54 has the third setting member 116 set the third sun gear 92 from the restriction state to the rotation state by moving the third arm portion 122C from the non-rotatable position to the rotatable position.

In a state where torque acting between the first setting member 112, which is the pawl member, and the first sun gear 72, which is the first transmission body, is less than or equal to a predetermined value M, the setting mechanism 54 is configured to set the first transmission body from the restriction state to the rotation state. It is preferred that the predetermined value M be 15 Nm. The predetermined value M is set by the shape of the pawl portion 112A of the first setting member 112, the shape of the grooves 72S in the first sun gear 72, and biasing force of the biasing member 119. In a state where torque acting between the third setting member 116, which is the pawl member, and the third sun gear 92, which is the first transmission body, is less than or equal to the predetermined value M, the setting mechanism 54 is configured to set the first transmission body from the restriction state to the rotation state. The predetermined value M is set by the shape of a pawl portion 116A of the third setting member 116, the shape of the grooves 92S in the third sun gear 92, and biasing force of the biasing member 119.

Figure 9:
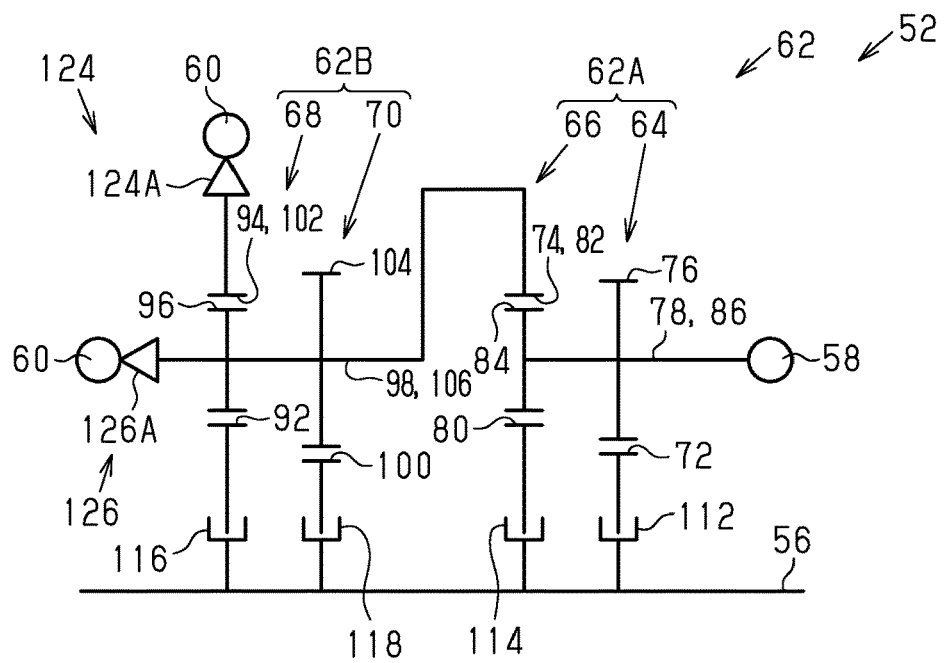
FIG. 9 is a skeleton diagram of the bicycle shifting device shown in FIGS. 2 and 3.

The relationship between each speed stage and the components of the transmission mechanism 52 will now be described with reference to FIGS. 9 to 14 and table 1. As shown in FIG. 9 and table 1, in a first speed stage, the first sun gear 72 is in the rotation state, the second sun gear 80 is in the rotation state, the third sun gear 92 is in the rotation state, and the fourth sun gear 100 is in the rotation state. As shown in FIG. 10, in the first speed stage, the shifting path S forms the non-shifting path S0. In this case, the transmission ratio is a minimum transmission ratio T0. The minimum transmission ratio T0 is one.

As shown in FIG. 9 and table 1, in a second speed stage, the first sun gear 72 is in the restriction state, the second sun gear 80 is in the rotation state, the third sun gear 92 is in the rotation state, and the fourth sun gear 100 is in the rotation state. As shown in FIG. 11, in the second speed stage, the shifting path S forms a first increase path S1. The first increase path S1 extends via the first shifting path S10 but not via the second shifting path S20. The shifting path S forms the first increase path S1 extending via only the first planetary shifting path S11 of the first shifting path S10. In this case, the transmission ratio is a first increase ratio T1, which is greater than the minimum transmission ratio T0. The first increase ratio T1 corresponds to "the first predetermined transmission ratio."

As shown in FIG. 9 and table 1, in a third speed stage, the first sun gear 72 is in the restriction state, the second sun gear 80 is in the rotation state, the third sun gear 92 is in the restriction state, and the fourth sun gear 100 is in the rotation state. As shown in FIG. 12, in the third speed stage, the shifting path S forms a second increase path S2. The second increase path S2 extends via the first shifting path S10 and the second shifting path S20. The shifting path S forms the second increase path S2 extending via the first planetary shifting path S11 of the first shifting path S10 and the third planetary shifting path S21 of the second shifting path S20. In this case, the transmission ratio is a second increase ratio T2, which is greater than the first increase ratio T1. The second increase ratio T2 corresponds to "the first transmission ratio" and "the second predetermined transmission ratio."

Figure 13:
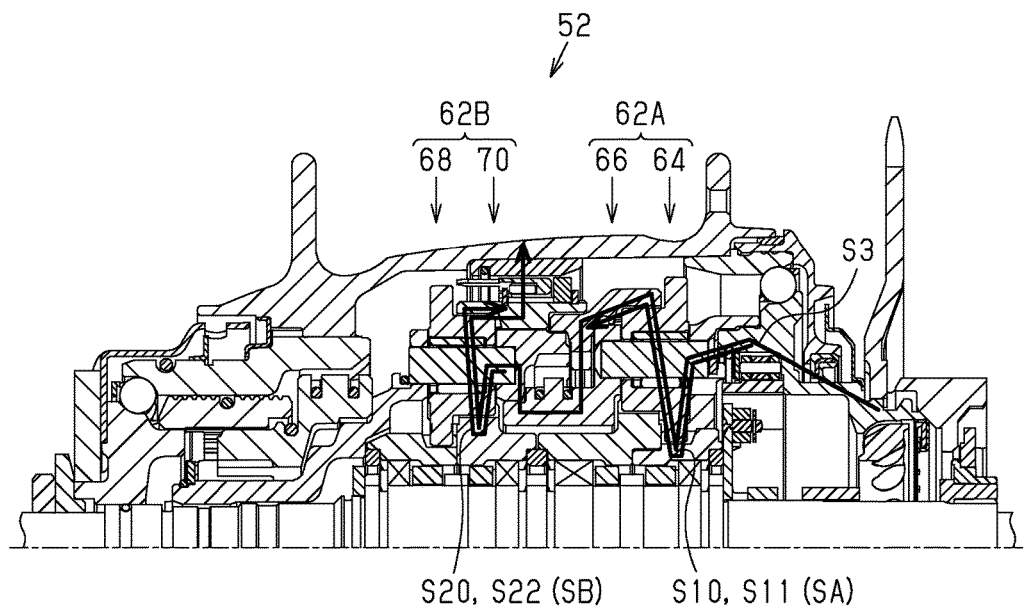
FIG. 13 is a diagram showing a shifting path of the bicycle shifting device shown in FIGS. 2 and 3 that establishes a fourth speed stage.

As shown in FIG. 9 and table 1, in a fourth speed stage, the first sun gear 72 is in the restriction state, the second sun gear 80 is in the rotation state, the third sun gear 92 is in the rotation state, and the fourth sun gear 100 is in the restriction state. As shown in FIG. 13, in the fourth speed stage, the shifting path S forms a third increase path S3. The third increase path S3 extends via the first shifting path S10 and the second shifting path S20. The shifting path S forms the third increase path S3 extending via the first planetary shifting path S11 of the first shifting path S10 and the fourth planetary shifting path S22 of the second shifting path S20. In this case, the transmission ratio is a third increase ratio T3, which is greater than the second increase ratio T2. The third increase ratio T3 corresponds to "the second transmission ratio" and "the transmission ratio that is greater than the second predetermined transmission ratio."

As shown in FIG. 9 and table 1, in a fifth speed stage, the first sun gear 72 is in the rotation state, the second sun gear 80 is in the restriction state, the third sun gear 92 is in the rotation state, and the fourth sun gear 100 is in the restriction state. As shown in FIG. 14, in the fifth speed stage, the shifting path S forms a fourth increase path S4. The fourth increase path S4 extends via the first shifting path S10 and the second shifting path S20. The shifting path S forms the fourth increase path S4 extending via the second planetary shifting path S12 of the first shifting path S10 and the fourth planetary shifting path S22 of the second shifting path S20. In this case, the transmission ratio is a fourth increase ratio T4, which is greater than the third increase ratio T3. The fourth increase ratio T4 corresponds to "the third transmission ratio" and "the transmission ratio that is greater than the second predetermined transmission ratio."

TABLE 2

| | Sun Gear Teeth | Planetary Gear Teeth | Ring Gear Teeth |
|---|---|---|---|
| 1st Planetary Mechanism | 40 | 22 | 72 |
| 2nd Planetary Mechanism | 44 | 14 | 72 |
| 3rd Planetary Mechanism | 36 | 24 | 72 |
| 4th Planetary Mechanism | 44 | 14 | 72 |

A first operation of the bicycle shifting device 50 of the first embodiment will now be described with reference to FIGS. 9 and 15 and table 1. The solid arrow of FIG. 15 indicates changes in the first shifting path S10 and the second shifting path S20 that establishes the shifting path S in a case of increasing the speed stage of the transmission mechanism 52. In a case of changing from the fourth speed stage to the fifth speed stage, the transmission mechanism 52 changes from the first planetary shifting path S11 to the second planetary shifting path S12. After changing from the first planetary shifting path S11 to the second planetary shifting path S12, the transmission mechanism 52 will not use the first planetary shifting path S11 again in higher speed stages. In a case of changing from the third speed stage to the fourth speed stage, the transmission mechanism 52 changes from the third planetary shifting path S21 to the fourth planetary shifting path S22. After changing from the third planetary shifting path S21 to the fourth planetary shifting path S22, the transmission mechanism 52 will not use the third planetary shifting path S21 again at higher speed stages.

A prior art bicycle shifting device includes a switching portion that switches to a state where a first shifting mechanism and a second shifting mechanism are coupled to transmit rotation from the second shifting mechanism to an output body in accordance with movement of the inner cable C. In the prior art bicycle shifting device, in a case of increasing the transmission ratio from the third transmission ratio to the fourth transmission ratio, the state is switched from where the shifting is performed using the sun gear of the second planetary gear mechanism to where the shifting

TABLE 1

| Speed Stage | Shifting Path | 1st Sun Gear | 2nd Sun Gear | 1st Shifting Path | 3rd Sun Gear | 4th Sun Gear | 2nd Shifting Path |
|---|---|---|---|---|---|---|---|
| 1 | Non-Shifting Path | Rotation State | Rotation State | Not Via | Rotation State | Rotation State | Not Via |
| 2 | 1st Increase Path | Restriction State | Rotation State | Via | Rotation State | Rotation State | Not Via |
| 3 | 2nd Increase Path | Restriction State | Rotation State | Via | Restriction State | Rotation State | Via |
| 4 | 3rd Increase Path | Restriction State | Rotation State | Via | Rotation State | Restriction State | Via |
| 5 | 4th Increase Path | Rotation State | Restriction State | Via | Rotation State | Restriction State | Via |

Table 2 shows one example of the number of gear teeth in the planetary mechanisms 64, 66, 68 and 70 of the present embodiment.

is performed using the sun gear of the first planetary gear mechanism. At the same time, in the prior art bicycle shifting device, the state is switched from where the first shifting mechanism and the second shifting mechanism are coupled to transmit rotation from the second shifting mechanism to the output body to where the rotation is transmitted to the output body from the first shifting mechanism. More specifically, in a case of increasing the transmission ratio from the third transmission ratio to the fourth transmission ratio, the switching between the first planetary gear mechanism and the second planetary gear mechanism and the switching of the connection state between the first shifting mechanism and the second shifting mechanism are both performed. This forms, for example, hypothetical third and fourth speed stages in the order indicated by the double-dashed arrow after the second speed stage indicated by the solid arrow in FIG. 15. The hypothetical third speed stage uses the second planetary shifting path S12 and does not use the second shifting path S20. The hypothetical fourth speed stage uses the first planetary shifting path S11 and the third planetary shifting path S21. Thus, in a case of changing from the hypothetical third speed stage to the hypothetical fourth speed stage, the shifting path is switched from the second planetary shifting path S12 to the first planetary shifting path S11. This complicates the configuration of the shifting paths.

The bicycle shifting device 50 uses the first one-way clutch 124A to switch between a state where rotation is transmitted from the first shifting mechanism 62A to the output body 60 and a state where rotation is transmitted from the first shifting mechanism 62A via the second shifting mechanism 62B and then to the output body 60 from the second shifting mechanism 62B. Thus, this switching can be performed without using external force such as the inner cable C1. Therefore, as compared to the prior art bicycle shifting device, the shifting performance is not easily adversely affected even in a case where large torque is input to the bicycle shifting device 50.

As shown in table 1, in a case where the speed stage is changed in the bicycle shifting device 50, only one of the first sun gear 72, the second sun gear 80, the third sun gear 92, and the fourth sun gear 100 is changed from the rotation stat to the restriction state. Thus, as compared to a configuration that changes a plurality of the sun gears 72, 80, 92 and 100 from the rotation state to the restriction state, the adverse effect on the shifting performance is limited in the case of changing to the restriction state.

With the bicycle shifting device 50, even in a case where the torque input to the bicycle shifting device 50 is increased by the driving of the motor 42 assisting human driving force, the adverse effect on the shifting performance is appropriately limited.

A second operation of the bicycle shifting device 50 of the first embodiment will now be described with reference to FIGS. 16 to 19 and table 1.

Figure 16:
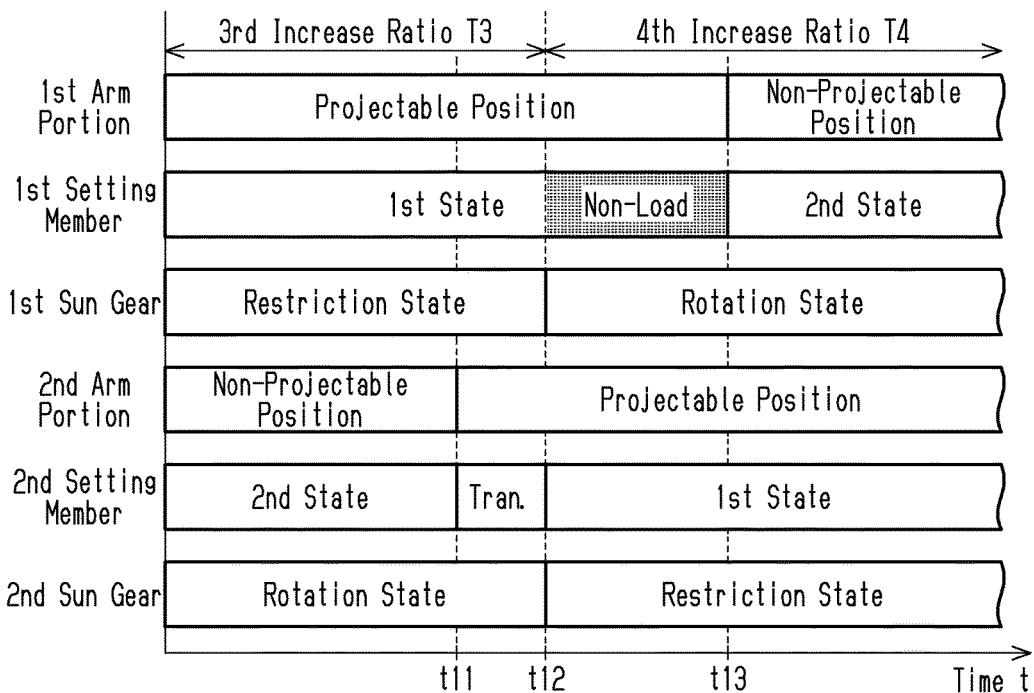
FIG. 16 is a time chart of each member in a case where the transmission ratio of the bicycle shifting device shown in FIGS. 2 and 3 is changed from the fourth speed stage to the fifth speed stage.

FIG. 16 shows one example of change in the state of each member in a case of performing the setting operation that changes from a third increase ratio T3 (fourth speed stage) to a fourth increase ratio T4 (fifth speed stage). Time t11 indicates the time at which the control member 120 is moved in a direction that increases the transmission ratio in a state where the third increase ratio T3 is formed. In the period up to time t11, the first arm portion 122A is located in the projectable position, and the second arm portion 122B is located in the non-projectable position. Thus, the first setting member 112 is maintained in the first state, the first sun gear 72 is maintained in the restriction state, the second setting member 114 is maintained in the second state, and the second sun gear 80 is maintained in the rotation state. At time t11, the second arm portion 122B moves from the non-projectable position to the projectable position. This forms a transition state where the second setting member 114 acts to change from the second state toward the first state. In a case where a pawl portion 114A of the second setting member 114 fits into one of grooves 80S in the rotating second sun gear 80, the second setting member 114 changes from the transition state to the first state.

Time t12 indicates the time at which the pawl portion 114A of the second setting member 114 fits into one of the grooves 80S in the second sun gear 80, the second setting member 114 changes to the first state, and the pawl portion 114A engages one of the grooves 80S of the second sun gear 80. At this time, the second sun gear 80 changes from the rotation state to the restriction state. The change of the second sun gear 80 from the rotation state to the restriction state changes the transmission ratio from the third increase ratio T3 to the fourth increase ratio T4. At this time, although the first setting member 112 is in the first state, a non-load state is formed in which the torque (drive torque) is not applied between the pawl portion 112A of the first setting member 112 and the first sun gear 72.

Time t13 indicates the time at which the first arm portion 122A is moved from the projectable position to the non-projectable position. At time t13, the first setting member 112 changes to the second state. At this time, the torque is not applied between the pawl portion 112A of the first setting member 112 and the first sun gear 72. This allows the first arm portion 122A to smoothly change the first setting member 112 to the second state.

Figure 17:
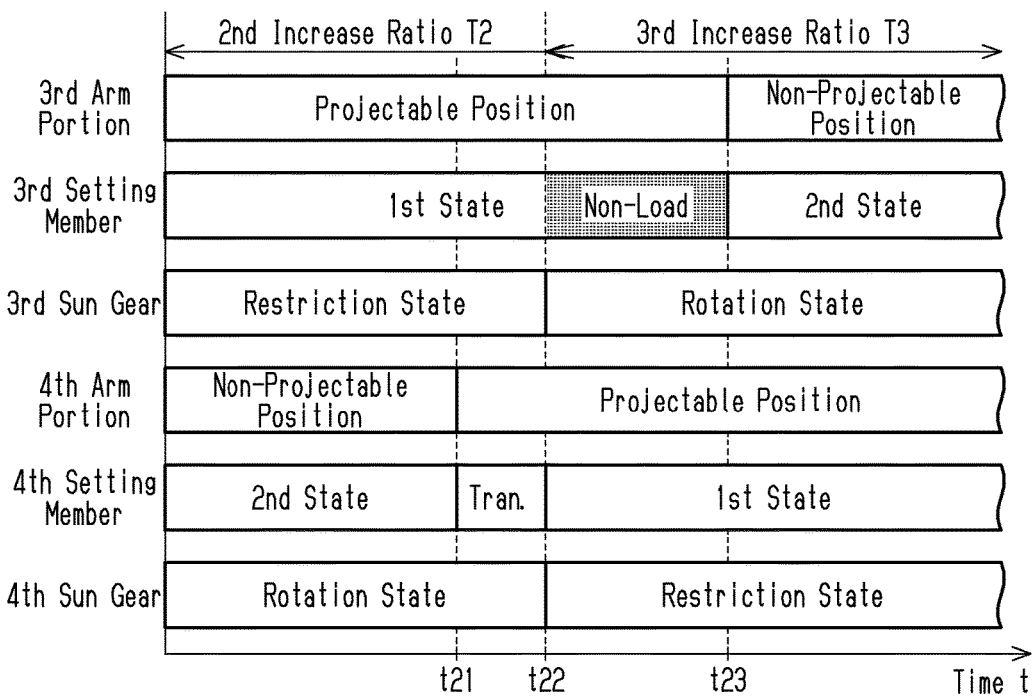
FIG. 17 is a time chart of each member in a case where the transmission ratio of the bicycle shifting device shown in FIGS. 2 and 3 is changed from the third speed stage to the fourth speed stage.

FIG. 17 shows one example of change in the state of each member in a case of performing the setting operation that changes from a second increase ratio T2 (third speed stage) to the third increase ratio T3 (fourth speed stage). Time t21 indicates the time at which the control member 120 is moved in a direction that increases the transmission ratio in a state where the second increase ratio T2 is formed. In the period up to time t21, the third arm portion 122C is located in the projectable position, and the fourth arm portion 122D is located in the non-projectable position. Thus, the third setting member 116 is maintained in the first state, the third sun gear 92 is maintained in the restriction state, the fourth setting member 118 is maintained in the second state, and the fourth sun gear 100 is maintained in the rotation state. At time t21, the fourth arm portion 122D moves from the non-projectable position to the projectable position. This forms a transition state where the fourth setting member 118 acts to change from the second state toward the first state. In a case where a pawl portion 118A of the fourth setting member 118 fits into one of grooves 100S in the rotating fourth sun gear 100, the fourth setting member 118 changes from the transition state to the first state.

Time t22 indicates the time at which the pawl portion 118A of the fourth setting member 118 fits into one of the grooves 100S in the fourth sun gear 100, the fourth setting member 118 changes to the first state, and the pawl portion 118A engages one of the grooves 100S of the fourth sun gear 100. At this time, the fourth sun gear 100 changes from the rotation state to the restriction state. The change of the fourth sun gear 100 from the rotation state to the restriction state changes the transmission ratio from the second increase ratio T2 to the third increase ratio T3. At this time, although the third setting member 116 is in the first state, a non-load state is formed in which the torque (drive torque) is not applied between the pawl portion 116A of the third setting member 116 and the third sun gear 92.

Time t23 indicates the time at which the third arm portion 122C is moved from the projectable position to the non-projectable position. At time t23, the third setting member 116 changes to the second state. At this time, the torque is not applied between the pawl portion 116A of the third setting member 116 and the third sun gear 92. This allows the third arm portion 122C to smoothly change the third setting member 116 to the second state.

Figure 18:
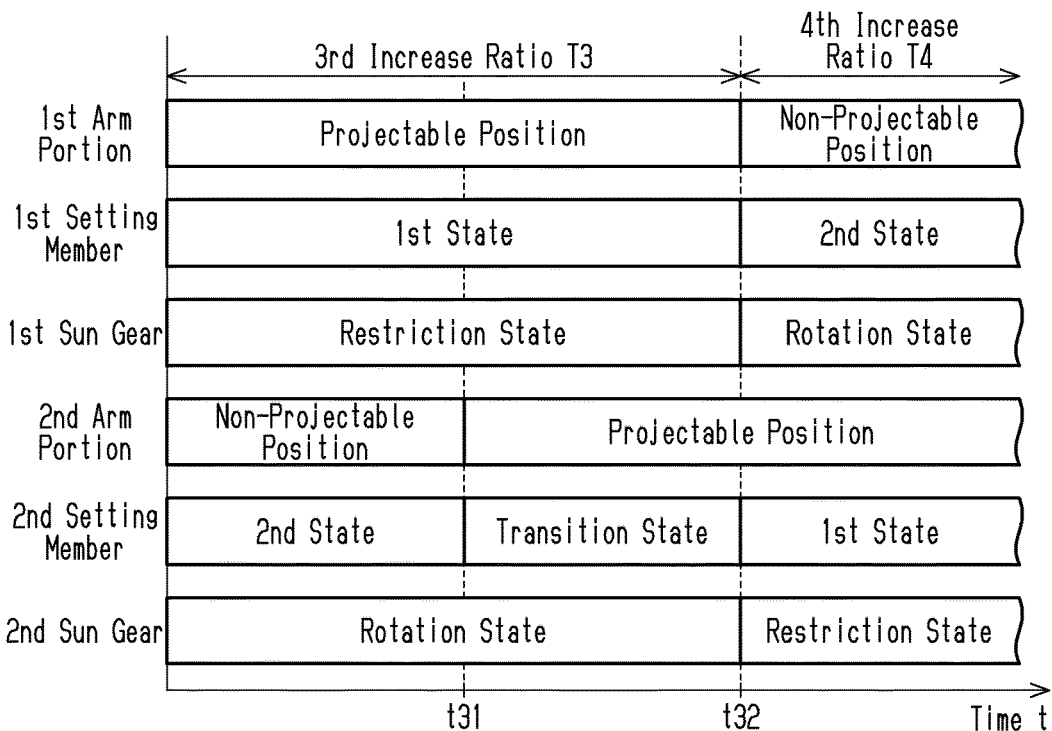
FIG. 18 is a time chart of each member in a case where a change of a second setting member from a second state to a first state is slower than the case shown in FIG. 16.

FIG. 18 shows one example of change in the state of each member in a case of performing the setting operation that changes from the third increase ratio T3 to the fourth increase ratio T4 in a case where the period from the time at which the projectable state of the second setting member 114 is formed until the second setting member 114 becomes the first state is longer than that in FIG. 16.

Time t31 indicates the same state as time t11 shown in FIG. 16. Time t32 indicates the time at which the first arm portion 122A is moved from the projectable position to the non-projectable position while the first setting member 112 is in the first state and the second setting member 114 is in the transition state. The torque acting between the pawl portion 112A of the first setting member 112 and the first sun gear 72 is less than or equal to the predetermined value M. Thus, as compared to a case where the torque acting between the pawl portion 112A of the first setting member 112 and the first sun gear 72 is greater than the predetermined value M, the first setting member 112 smoothly moves to the second state. At time t32, the pawl portion 114A of the second setting member 114 is fitted to one of the grooves 80S in the second sun gear 80, and the second setting member 114 is changed to the first state. This changes the second sun gear 80 from the rotation state to the restriction state. Consequently, the transmission ratio changes from the third increase ratio T3 to the fourth increase ratio T4. Since the first arm portion 122A is moved from the projectable position to the non-projectable position, the first sun gear 72 changes from the restriction state to the rotation state.

Figure 19:
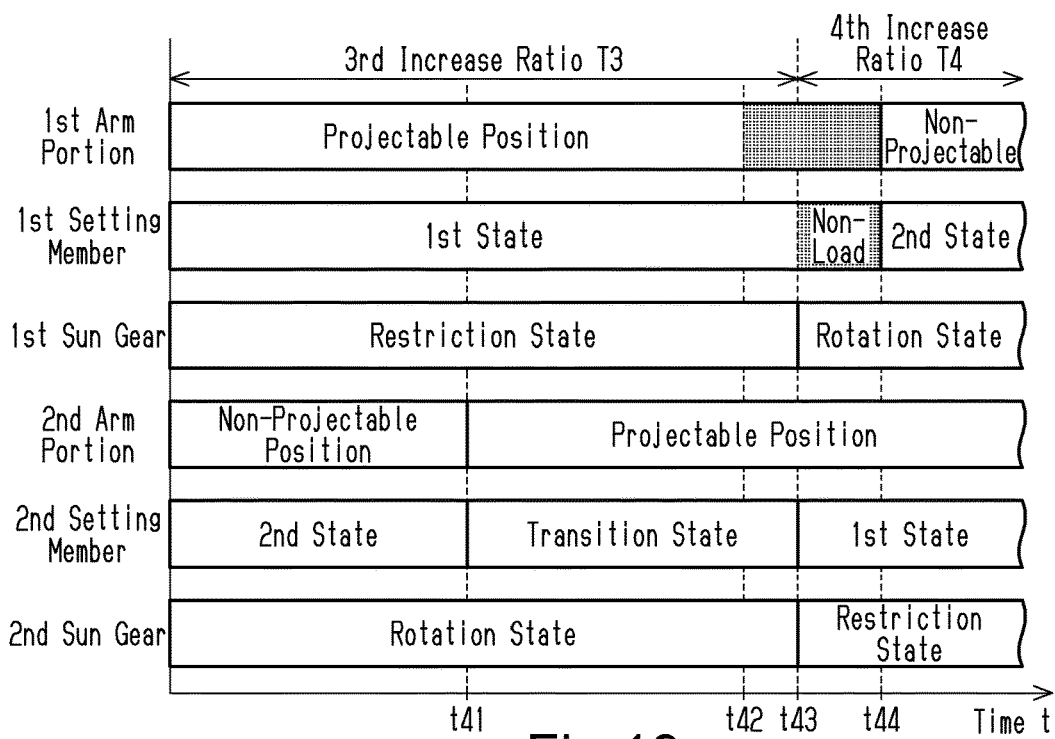
FIG. 19 is a time chart of each member in a case where the change of the second setting member from the second state to the first state is slower than the case shown in FIG. 18.

FIG. 19 shows one example of change in the state of each member in a case of performing the setting operation that changes from the third increase ratio T3 to the fourth increase ratio T4 in a case where the period from the time at which the projectable state of the second setting member 114 is formed until the second setting member 114 becomes the first state is longer than that in FIG. 18.

Time t41 indicates the same state as time t11 shown in FIG. 16. Time t42 indicates the time at which the first arm portion 122A is moved to a point of the projectable position immediately before the non-projectable position while the first setting member 112 is in the first state and the second setting member 114 is in the transition state. The first arm portion 122A does not move to the non-projectable position until the force being applied from the first arm portion 122A to the first setting member 112 exceeds the torque acting between the pawl portion 112A of the first setting member 112 and the first sun gear 72.

Time t43 indicates the time at which the pawl portion 114A of the second setting member 114 fits into one of the grooves 80S in the second sun gear 80, and the second setting member 114 changes to the first state. At this time, the second sun gear 80 changes from the rotation state to the restriction state. The change of the second sun gear 80 to the restriction state changes the transmission ratio from the third increase ratio T3 to the fourth increase ratio T4. At this time, although the first setting member 112 is in the first state, a non-load state is formed in which the torque (drive torque) is not applied between the pawl portion 112A of the first setting member 112 and the first sun gear 72.

Time t44 indicates the time at which the force being applied from the first arm portion 122A to the first setting member 112 exceeds the torque acting between the pawl portion 112A of the first setting member 112 and the first sun gear 72, and the first arm portion 122A is moved to the non-projectable position. Since the state where the torque is not applied between the pawl portion 112A of the first setting member 112 and the first sun gear 72 is formed at time t43, the first arm portion 122A smoothly moves to the non-projectable position.

In a case of performing the setting operation that changes from the second increase ratio T2 to the third increase ratio T3, after time t21, even if the fourth setting member 118 is changed to the first state over a longer period of time than that in FIG. 17, the transmission ratio is appropriately changed in the same manner as in FIGS. 18 and 19.

Second Embodiment

A second embodiment of a transmission mechanism 52A of the bicycle shifting device 50 will now be described with reference to FIGS. 20 to 29. The transmission mechanism 52A of the second embodiment is the same as the transmission mechanism 52 of the first embodiment except that the number of gear teeth differs from that of the transmission mechanism 52 of the first embodiment and a sleeve 128 has a different shape. Thus, the same reference characters are given to those components that are the same as the corresponding components of the first embodiment. Such components will not be described in detail.

Figure 20:
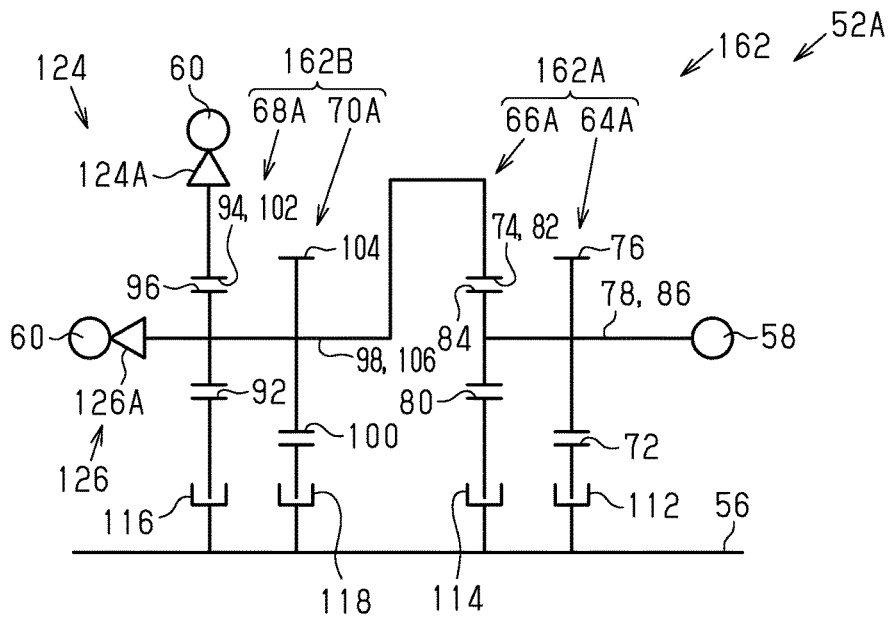
FIG. 20 is a skeleton diagram showing a second embodiment of a bicycle shifting device.

As shown in FIG. 20, the transmission mechanism 52A includes a plurality of shifting mechanisms 162. The plurality of shifting mechanisms 162 includes at least a first shifting mechanism 162A. The plurality of shifting mechanisms 162 further includes a second shifting mechanism 162B. The transmission mechanism 52A transmits rotation from the input body 58 to the output body 60 at transmission ratios of three or more steps.

Each of the plurality of shifting mechanisms 162 includes at least one of planetary mechanisms 64A, 66A, 68A and 70A. The plurality of shifting mechanisms 162 includes a first planetary mechanism 64A and a second planetary mechanism 66A. The plurality of shifting mechanisms 162 further includes a third planetary mechanism 68A and a fourth planetary mechanism 70A. More specifically, the first shifting mechanism 162A includes the first planetary mechanism 64A and the second planetary mechanism 66A. The second shifting mechanism 162B includes the third planetary mechanism 68A and the fourth planetary mechanism 70A. The first planetary mechanism 64A is located next to the input body 58 in an axial direction of the bicycle shifting device 50. The second planetary mechanism 66A is located next to the first planetary mechanism 64 at the opposite side of the input body 58 in the axial direction of the bicycle shifting device 50. The fourth planetary mechanism 70A is located next to the second planetary mechanism 66A at the opposite side of the first planetary mechanism 64A in the axial direction of the bicycle shifting device 50. The third planetary mechanism 68A is located next to the fourth planetary mechanism 70A at the opposite side of the second planetary mechanism 66A in the axial direction of the bicycle shifting device 50.

The first planetary mechanism 64A includes the first sun gear 72, the first ring gear 74, the first planetary gears 76 and the first carrier 78. The second planetary mechanism 66A includes the second sun gear 80, the second ring gear 82, the second planetary gear 84 and the second carrier 86. Each of the first planetary mechanism 64A and the second planetary mechanism 66A is configured to increase the rotational speed transmitted from the input body 58 to the output body 60.

The third planetary mechanism 68A includes the third sun gear 92, the third ring gear 94, the third planetary gears 96 and the third carrier 98. The fourth planetary mechanism 70A includes the fourth sun gear 100, the fourth ring gear 102, the fourth planetary gear 104 and the fourth carrier 106. The third planetary mechanism 68A is configured to increase the speed of rotation from the input body 58 and output the rotation. The fourth planetary mechanism 70A is configured to increase the speed of rotation from the input body 58 and output the rotation.

The setting mechanism 54 includes the first setting member 112, the second setting member 114, the third setting member 116, the fourth setting member 118, the control member 120, the sleeve 128, the first switching portion 124 and the second switching portion 126.

Figure 21:
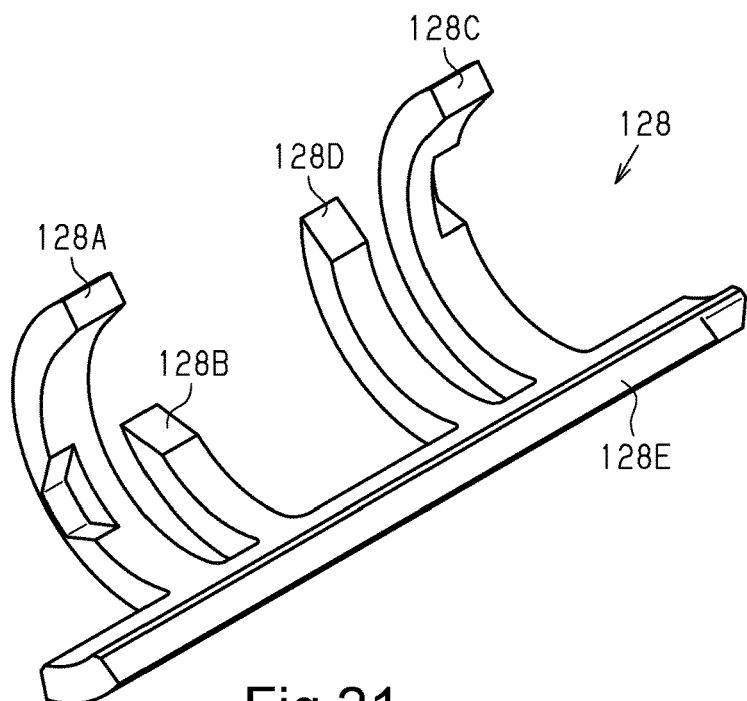
FIG. 21 is a perspective view of a sleeve used in the bicycle shifting device shown in FIG. 20.

As shown in FIG. 21, the sleeve 128 includes a first arm portion 128A, a second arm portion 128B, a third arm portion 128C, a fourth arm portion 128D, and a base portion 128E. Each of the arm portions 128A to 128D is curved in a circumferential direction of the support member 56. The base portion 128E extends in an axial direction of the support member 56 to connect the arm portions 128A to 128D. The number of the arm portions 128A to 128D is equal to the number of the setting members 112, 114, 116 and 118. An inclined surface is formed on an end portion or an intermediate portion of each of the arm portions 128A to 128D in a direction in which the arm portions 128A to 128D extend. The sleeve 128 is fitted to the control member 120 to rotate integrally with the control member 120 around the support member 56.

The first setting member 112 (refer to FIG. 5) is located between the first sun gear 72 and the support member 56. The first setting member 112 includes the pawl portion 112A and the engagement portion 112B engaging with an inner circumferential surface of the first arm portion 128A. In a case where the first arm portion 128A rotates around the support member 56, the engagement portion 112B moves along the inclined surface of the first arm portion 128A, and the first setting member 112 rotates. The rotation state and the restriction state of the second sun gear 80 are formed by the second setting member 114 and the second arm portion 128B. The rotation state and the restriction state of the third sun gear 92 are formed by the third setting member 116 and the third arm portion 128C. The rotation state and the restriction state of the fourth sun gear 100 are formed by the fourth setting member 118 and the fourth arm portion 128D. In the setting mechanism 54, the inclined surfaces of the arm portions 128A to 128D of the sleeve 128 are located at different positions in the circumferential direction to obtain different rotation phases of the control member 120 at which each of the sun gears 72, 80, 92, 100 is switched between the rotation state and the restriction state.

The transmission mechanism 52A forms at least the first shifting path S10 and the second shifting path S20. The first shifting path S10 transmits rotation from the input body 58 to the output body 60 at one of a first transmission ratio and a second transmission ratio, which are included in transmission ratios of at least three (three or more steps), by changing the rotational speed with at least the first shifting mechanism 162A. The second shifting path S20 transmits rotation from the input body 58 to the output body 60 at a greater transmission ratio than the first transmission ratio and the second transmission ratio by changing the rotational speed with the second shifting mechanism 162B, which differs from the shifting mechanism 162 that establishes the first shifting path S10. The fourth planetary shifting path S22 transmits rotation from the input body 58 to the output body 60 at a fourth transmission ratio, which is greater than the third transmission ratio, by changing the speed of the rotation not with the third planetary mechanism 68A but with the fourth planetary mechanism 70A. The setting mechanism 54 sets the shifting path S so that the rotational speed is not changed by the third planetary mechanism 68A in a shifting path S corresponding to a transmission ratio that is greater than the fourth transmission ratio.

The first shifting path S10 includes the first planetary shifting path S11 and the second planetary shifting path S12. The first planetary shifting path S11 transmits rotation from the input body 58 to the output body 60 at the first transmission ratio by changing the rotational speed with the first planetary mechanism 64A and not with the second planetary mechanism 66A. The second planetary shifting path S12 transmits rotation from the input body 58 to the output body 60 at the second transmission ratio by changing the rotational speed not with the first planetary mechanism 64A but with the second planetary mechanism 66A.

The setting mechanism 54 sets the transmission mechanism 52A so that the rotational speed is not changed by the first planetary mechanism 64A in the second shifting path S20. The second shifting path S20 includes the third planetary shifting path S21 and the fourth planetary shifting path S22. The third planetary shifting path S21 transmits rotation from the input body 58 to the output body 60 at the third transmission ratio, which is greater than the second transmission ratio, by changing the rotational speed with the third planetary mechanism 68A and not with the fourth planetary mechanism 70A. The fourth planetary shifting path S22 transmits rotation from the input body 58 to the output body 60 at the fourth transmission ratio, which is greater than the third transmission ratio, by changing the rotational speed not with the third planetary mechanism 68A but with the fourth planetary mechanism 70A.

The first shifting path S10 transmits rotation from the input body 58 to the output body 60 at the first predetermined transmission ratio in the transmission ratios of three or more steps by changing the rotational speed with at least one of the shifting mechanisms 162. The second shifting path S20 transmits rotation from the input body 58 to the output body 60 at the second predetermined transmission ratio, which is greater than the first predetermined transmission ratio, by changing the rotational speed with one of the shifting mechanisms 162 differing from the shifting mechanism that establishes the first shifting path S10. In a case where the rotational speed is changed in the second shifting path S20 by the shifting mechanism 162 that establishes the first shifting path S10, the setting mechanism 54 sets the transmission mechanism 52A so that the rotational speed is changed by the shifting mechanism 62 that establishes the first shifting path S10 in a shifting path S corresponding to a transmission ratio that is greater than the second predetermined transmission ratio.

Figure 22:
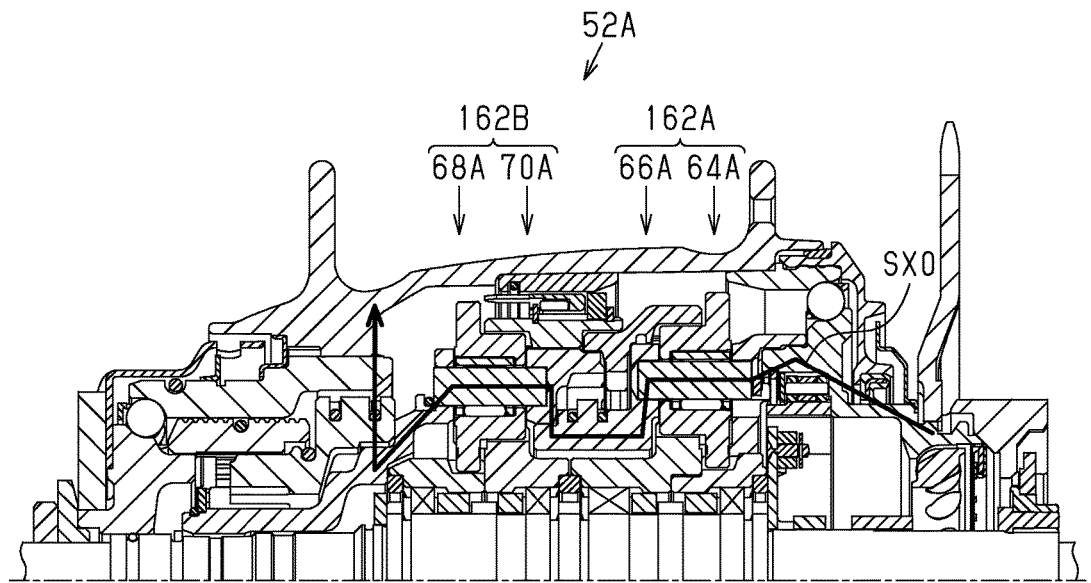
FIG. 22 is a diagram showing a shifting path of the bicycle shifting device shown in FIG. 20 that establishes a first speed stage.

The relationship between each speed stage and the components of the transmission mechanism 52A will now be described with reference to FIGS. 20 and 22 to 26 and table 3. As shown in FIG. 20 and table 3, in the first speed stage, the first sun gear 72 is in the rotation state, the second sun gear 80 is in the rotation state, the third sun gear 92 is in the rotation state, and the fourth sun gear 100 is in the rotation state. As shown in FIG. 22, in the first speed stage, the shifting path S forms a non-shifting path SX0. In this case, the transmission ratio is a minimum transmission ratio R0. The minimum transmission ratio R0 is one.

Figure 23:
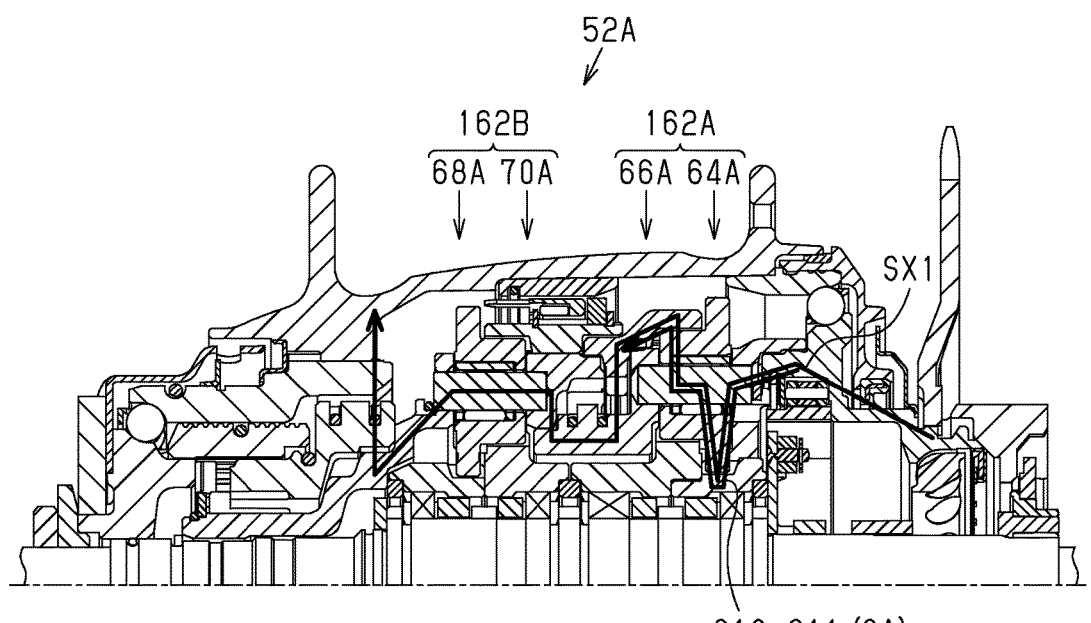
FIG. 23 is a diagram showing a shifting path of the bicycle shifting device shown in FIG. 20 that establishes a second speed stage.

As shown in FIG. 20 and table 3, in the second speed stage, the first sun gear 72 is in the restriction state, the second sun gear 80 is in the rotation state, the third sun gear 92 is in the rotation state, and the fourth sun gear 100 is in the rotation state. As shown in FIG. 23, in the second speed stage, the shifting path S forms a first increase path SX1. The first increase path SX1 extends via the first shifting path S10 and does not extend via the second shifting path S20. The shifting path S forms the first increase path SX1 extending via only the first planetary shifting path S11 of the first shifting path S10. In this case, the transmission ratio is a first increase ratio R1, which is greater than one. The first increase ratio R1 corresponds to "the first transmission ratio."

As shown in FIG. 20 and table 3, in the fifth speed stage, the first sun gear 72 is in the rotation state, the second sun gear 80 is in the restriction state, the third sun gear 92 is in the rotation state, and the fourth sun gear 100 is in the restriction state. As shown in FIG. 26, in the fifth speed stage, the shifting path S forms a fourth increase path SX4. The fourth increase path SX4 extends via the first shifting path S10 and the second shifting path S20. The shifting path S forms the fourth increase path SX4 extending via the second planetary shifting path S12 of the first shifting path S10 and the fourth planetary shifting path S22 of the second shifting path S20. In this case, the transmission ratio is a fourth increase ratio R4, which is greater than the third increase ratio R3. The fourth increase ratio R4 corresponds to "the fourth transmission ratio" and "the transmission ratio that is greater than the second predetermined transmission ratio."

TABLE 3

| Speed Stage | Shifting Path | 1st Sun Gear | 2nd Sun Gear | 1st Shifting Path | 3rd Sun Gear | 4th Sun Gear | 2nd Shifting Path |
|---|---|---|---|---|---|---|---|
| 1 | Non-Shifting Path | Rotation State | Rotation State | Not Via | Rotation State | Rotation State | Not Via |
| 2 | 1st Increase Path | Restriction State | Rotation State | Via | Rotation State | Rotation State | Not Via |
| 3 | 2nd Increase Path | Rotation State | Restriction State | Via | Rotation State | Rotation State | Not Via |
| 4 | 3rd Increase Path | Rotation State | Restriction State | Via | Restriction State | Rotation State | Via |
| 5 | 4th Increase Path | Rotation State | Restriction State | Via | Rotation State | Restriction State | Via |

Figure 24:
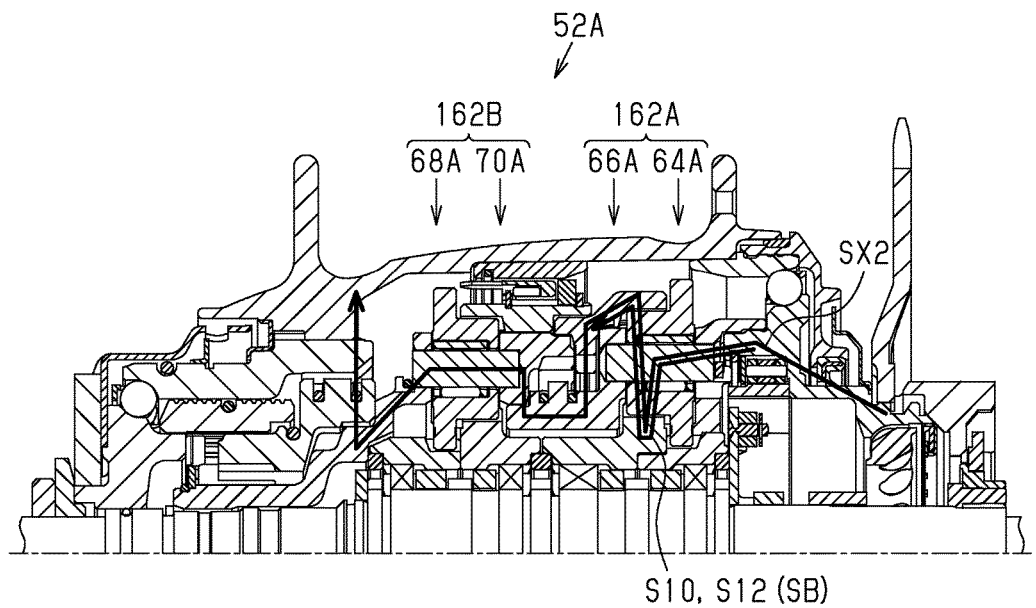
FIG. 24 is a diagram showing a shifting path of the bicycle shifting device shown in FIG. 20 that establishes a third speed stage.

As shown in FIG. 20 and table 3, in the third speed stage, the first sun gear 72 is in the rotation state, the second sun gear 80 is in the restriction state, the third sun gear 92 is in the rotation state, and the fourth sun gear 100 is in the rotation state. As shown in FIG. 24, in the third speed stage, the shifting path S forms a second increase path SX2. The second increase path SX2 extends via the first shifting path S10 and does not extend via the second shifting path S20. The shifting path S forms the second increase path SX2 extending via the second planetary shifting path S12 of the first shifting path S10. In this case, the transmission ratio is a second increase ratio R2, which is greater than the first increase ratio R1. The second increase ratio R2 corresponds to "the second transmission ratio" and "the first predetermined transmission ratio."

Figure 25:
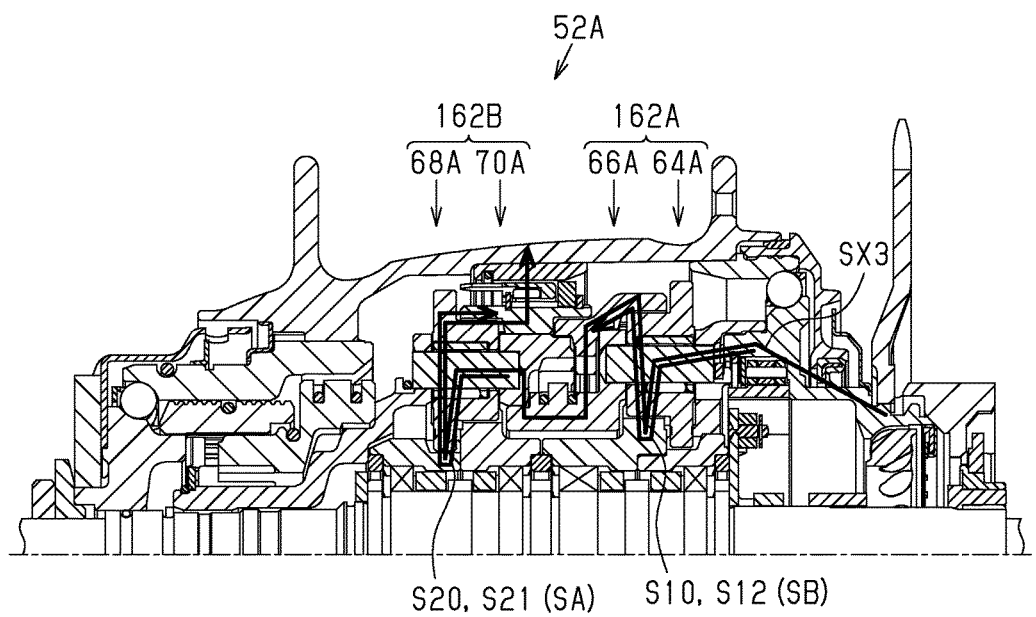
FIG. 25 is a diagram showing a shifting path of the bicycle shifting device shown in FIG. 20 that establishes a fourth speed stage.

As shown in FIG. 20 and table 3, in the fourth speed stage, the first sun gear 72 is in the rotation state, the second sun gear 80 is in the restriction state, the third sun gear 92 is in the restriction state, and the fourth sun gear 100 is in the rotation state. As shown in FIG. 25, in the fourth speed stage, the shifting path S forms a third increase path SX3. The third increase path SX3 extends via the first shifting path S10 and the second shifting path S20. The shifting path S forms the third increase path SX3 extending via the second planetary shifting path S12 of the first shifting path S10 and the third planetary shifting path S21 of the second shifting path S20. In this case, the transmission ratio is a third increase ratio R3, which is greater than the second increase ratio R2. The third increase ratio R3 corresponds to "the third transmission ratio" and "the second predetermined transmission ratio."

Table 4 shows one example of the number of gear teeth in the planetary mechanisms 64A, 66A, 68A and 70A of the present embodiment.

TABLE 4

|  | Sun Gear Teeth | Planetary Gear Teeth | Ring Gear Teeth |
|---|---|---|---|
| 1st Planetary Mechanism | 38 | 26 | 74 |
| 2nd Planetary Mechanism | 46 | 14 | 74 |
| 3rd Planetary Mechanism | 38 | 26 | 74 |
| 4th Planetary Mechanism | 46 | 14 | 74 |

A first operation of the bicycle shifting device 50 of the second embodiment will now be described with reference to FIG. 27. The solid arrow of FIG. 27 indicates changes in the first shifting path S10 and the second shifting path S20 that establishes the shifting path S in a case of increasing the speed stage of the transmission mechanism 52A. In a case of changing from the second speed stage to the third speed stage, the transmission mechanism 52A changes from the first planetary shifting path S11 to the second planetary shifting path S12. After changing from the first planetary shifting path S11 to the second planetary shifting path S12, the transmission mechanism 52A will not use the first planetary shifting path S11 again in higher speed stages. In a case of changing from the fourth speed stage to the fifth speed stage, the transmission mechanism 52A changes from the third planetary shifting path S21 to the fourth planetary shifting path S22. After changing from the third planetary shifting path S21 to the fourth planetary shifting path S22, the transmission mechanism 52A will not use the third planetary shifting path S21 again at higher speed stages. The bicycle shifting device 50 of the second embodiment has the same advantages as that of the first embodiment.

A second operation of the bicycle shifting device 50 of the second embodiment will now be described with reference to FIGS. 28 and 29 and table 3.

Figure 28:
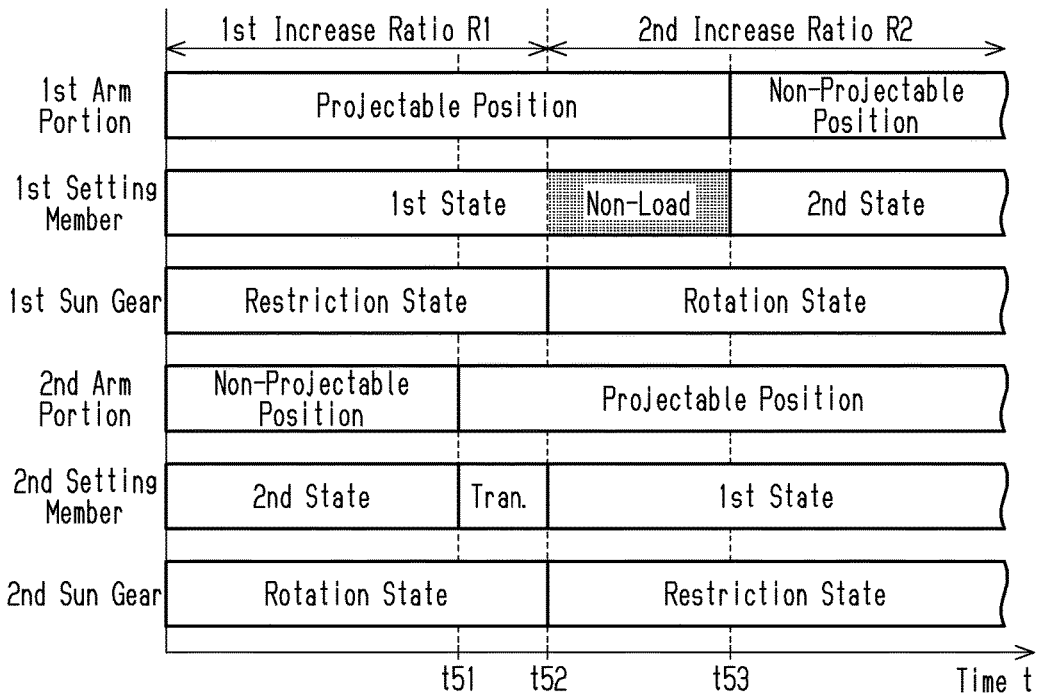
FIG. 28 is a time chart of each member in a case where the transmission ratio of the bicycle shifting device shown in FIG. 20 is changed from the second speed stage to the third speed stage.

FIG. 28 shows one example of change in the state of each member in a case of performing the setting operation that changes from the first increase ratio R1 (second speed stage) to the second increase ratio R2 (third speed stage). Time t51 indicates the time at which the control member 120 is moved in a direction that increases the transmission ratio in a state where the first increase ratio R1 is formed. In the period up to time t51, the first arm portion 122A is located in the projectable position, and the second arm portion 122B is located in the non-projectable position. Thus, the first setting member 112 is maintained in the first state, the first sun gear 72 is maintained in the restriction state, the second setting member 114 is maintained in the second state, and the second sun gear 80 is maintained in the rotation state. At time t51, the second arm portion 122B moves from the non-projectable position to the projectable position. This forms a transition state where the second setting member 114 acts to change from the second state to the first state. In a case where the pawl portion 114A fits into one of the grooves 80S in the rotating second sun gear 80, the second setting member 114 changes from the transition state to the first state.

Time t52 indicates the time at which the pawl portion 114A of the second setting member 114 fits to one of the grooves 80S in the second sun gear 80, the second setting member 114 changes to the first state, and the pawl portion 114A engages one of the grooves 80S of the second sun gear 80. At this time, the second sun gear 80 changes from the rotation state to the restriction state. The change of the second sun gear 80 from the rotation state to the restriction state changes the transmission ratio from the first increase ratio R1 to the second increase ratio R2. At this time, although the first setting member 112 is in the first state, the non-load state is formed in which the torque (drive torque) is not applied between the pawl portion 112A of the first setting member 112 and the first sun gear 72.

Time t53 indicates the time at which the first arm portion 122A is moved from the projectable position to the non-projectable position. At time t53, the first setting member 112 changes to the second state. At this time, the torque is not applied between the pawl portion 112A of the first setting member 112 and the first sun gear 72. This allows the first arm portion 122A to smoothly change the first setting member 112 to the second state.

Figure 29:
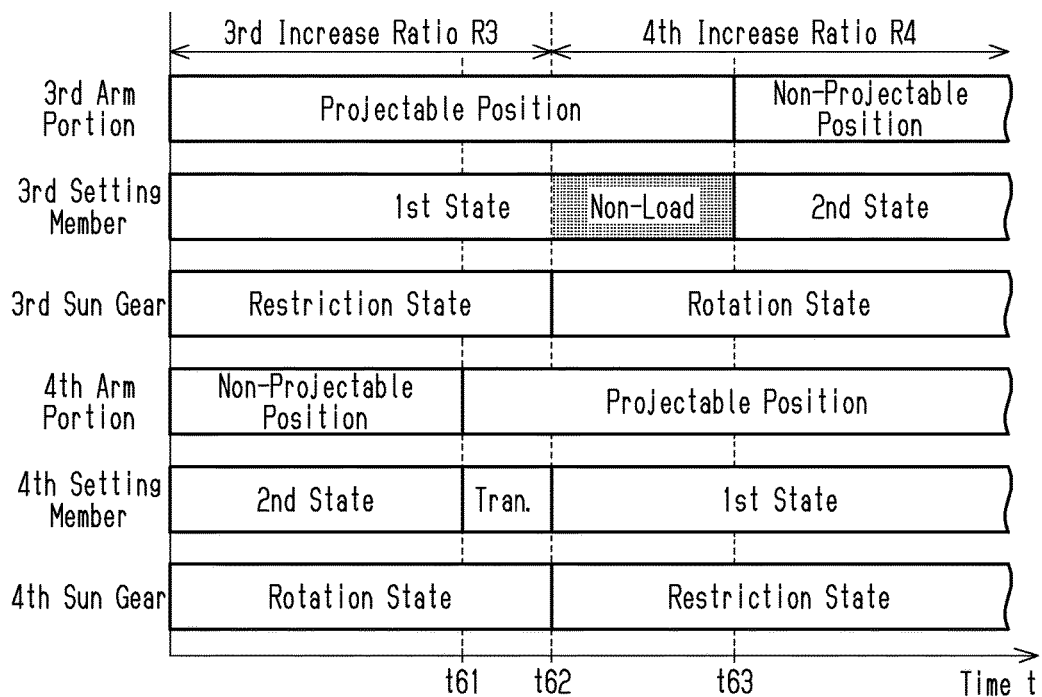
FIG. 29 is a time chart of each member in a case where the transmission ratio of the bicycle shifting device shown in FIG. 20 is changed from the fourth speed stage to the fifth speed stage.

FIG. 29 shows one example of change in the state of each member in a case of performing the setting operation that changes from the third increase ratio R3 (fourth speed stage) to the fourth increase ratio R4 (fifth speed stage). Time t61 indicates the time at which the control member 120 is moved in a direction that increases the transmission ratio in a state where the third increase ratio R3 is formed. In the period up to time t61, the third arm portion 122C is located in the projectable position, and the fourth arm portion 122D is located in the non-projectable position. Thus, the third setting member 116 is maintained in the first state, the third sun gear 92 is maintained in the restriction state, the fourth setting member 118 is maintained in the second state, and the fourth sun gear 100 is maintained in the rotation state. At time t61, the fourth arm portion 122D moves from the non-projectable position to the projectable position. This forms a transition state where the fourth setting member 118 acts to change from the second state toward the first state. In a case where the pawl portion 118A fits into one of grooves 100S in the rotating fourth sun gear 100, the fourth setting member 118 changes from the transition state to the first state.

Time t62 indicates the time at which the pawl portion 118A of the fourth setting member 118 fits into one of the grooves 100S in the fourth sun gear 100, the fourth setting member 118 changes to the first state, and the pawl portion 118A engages one of the grooves 100S of the fourth sun gear 100. At this time, the fourth sun gear 100 changes from the rotation state to the restriction state. The change of the fourth sun gear 100 from the rotation state to the restriction state changes the transmission ratio from the third increase ratio R3 to the fourth increase ratio R4. At this time, although the third setting member 116 is in the first state, a non-load state is formed in which the torque (drive torque) is not applied between the pawl portion 116A of the third setting member 116 and the third sun gear 92.

Time t63 indicates the time at which the third arm portion 122C is moved from the projectable position to the non-projectable position. At time t63, the third setting member 116 is changed to the second state. At this time, the torque is not applied between the pawl portion 116A of the third setting member 116 and the third sun gear 92. This allows the third arm portion 122C to smoothly change the third setting member 116 to the second state.

In a case of performing the setting operation that changes from the first increase ratio R1 to the second increase ratio R2, after time t51, even if the second setting member 114 is changed to the first state over a longer period of time than FIG. 28, the transmission ratio is appropriately changed in the same manner as in FIGS. 18 and 19 of the first embodiment. In a case of performing the setting operation that changes from the third increase ratio R3 to the fourth increase ratio R4, after time t61, even if the fourth setting member 118 is changed to the first state over a longer period of time than FIG. 29, the transmission ratio is appropriately changed in the same manner as in FIGS. 18 and 19 of the first embodiment.

Modifications

The description of the above embodiments illustrates embodiments of a bicycle shifting device and a bicycle assist system including a bicycle shifting device according to the present invention and is not intended to be restrictive. The bicycle shifting device and the bicycle assist system including the bicycle shifting device according to the present invention can include, for example, the following modifications of the embodiments. Further, two or more of the modifications can be combined. In the following modifications, the same reference characters are given to those components that are the same as the corresponding components of the embodiments. Such components will not be described in detail.

Figure 30:
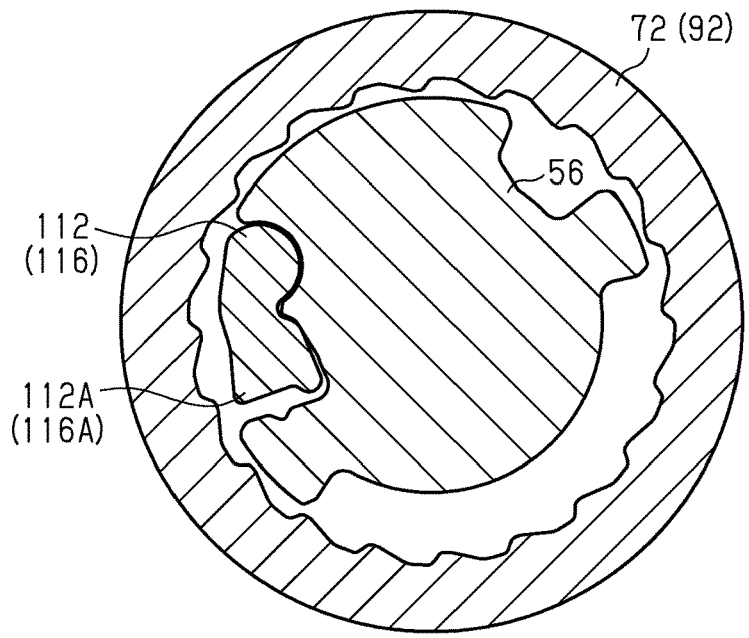
FIG. 30 is a cross-sectional view of a pawl member of a first setting member and a groove in a first modification.
Figure 31:
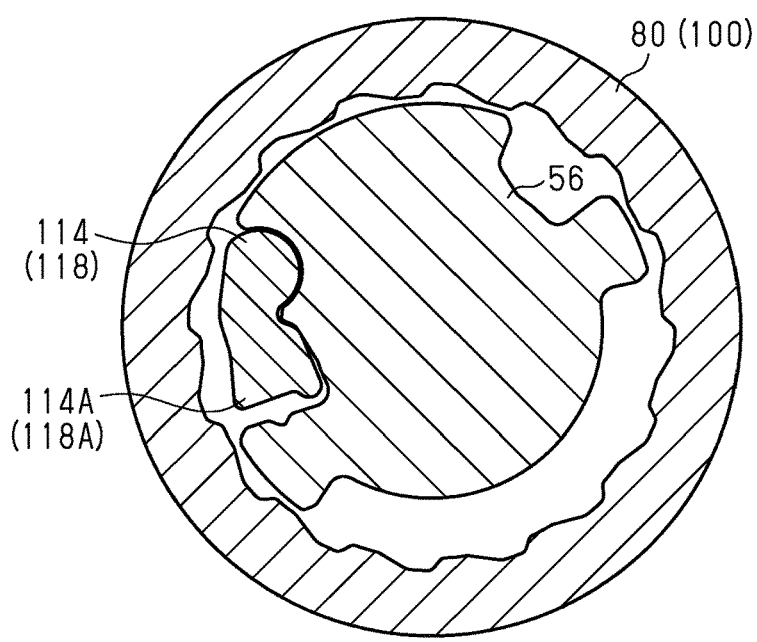
FIG. 31 is a cross-sectional view of a pawl member of a second setting member and a groove in a second modification.

The shape of the pawl portion 112A of the first setting member 112, the shape of the pawl portion 116A of the third setting member 116, the shape of the grooves 72S in the first sun gear 72, and the shape of the grooves 92S in the third sun gear 92 can be changed as shown in FIG. 30. Also, the shape of the pawl portion 114A of the second setting member 114, the shape of the pawl portion 118A of the fourth setting member 118, the shape of the grooves 80S in the second sun gear 80, and the shape of the grooves 100S in the fourth sun gear 100 can be changed as shown in FIG. 31. As shown in FIGS. 30 and 31, the number of the grooves 72S in the first sun gear 72 can be greater than the number of the grooves 80S in the second sun gear 80 and the number of the grooves 100S in the fourth sun gear 100. As shown in FIGS. 30 and 31, the number of the grooves 92S in the third sun gear 92 can be greater than the number of the grooves 100S in the fourth sun gear 100.

Each of the transmission mechanisms 52 and 52A of the embodiments can be changed to a transmission mechanism transmitting rotation from the input body 58 to the output body 60 at transmission ratios of two steps. Also, in this case, the transmission ratio is appropriately changed by setting the first transmission body from the restriction state to the rotation state after setting the second transmission body from the rotation state to the restriction state in the setting operation. In this modification, one of the first shifting mechanism 62A and the second shifting mechanism 62B can be omitted.

Each of the shifting mechanisms 62A and 62B can include three or more planetary gear mechanisms. In this case, a predetermined sun gear serves as the first transmission body with respect to a sun gear having the next fewer teeth, and the sun gear having the next fewer teeth serves as the second transmission body with respect to the predetermined sun gear.

One of the third planetary mechanisms 68 and 68A and the fourth planetary mechanisms 70 and 70A can be omitted from the second shifting mechanisms 62B, 162B, respectively.

At least one of the planetary mechanisms 64, 64A, 66, 66A, 68, 68A, 70 and 70A can be changed to a planetary roller mechanism. At least one of the planetary mechanisms 64, 64A, 66, 66A, 68, 68A, 70 and 70A can be changed to a reduction mechanism reducing the speed of rotation from the input body 58 and outputting the rotation.

The bicycle shifting device 50 can be installed on a bicycle 10 that does not include the motor 42. The bicycle shifting device 50 can be provided around the crankshaft 20A. In this case, the bicycle shifting device 50 changes the speed of rotation that is input to the crankshaft 20A and transmits the rotation to the front rotary body 24.

A controller can be provided on the bicycle 10 to control the bicycle shifting device 50. The controller, for example, controls the bicycle shifting device 50 to change the speed stage so that cadence is included in a predetermined range.

What is claimed is:

1. A bicycle shifting device changing speed of rotation of an input body and transmitting the rotation to an output body, the bicycle shifting device comprising:
a plurality of shifting mechanisms configured to change a rotational speed transmitted from the input body to the output body;
a transmission mechanism configured to transmit the rotation from the input body to the output body at transmission ratios of at least three steps; and
a setting mechanism configured to set a plurality of shifting paths in the transmission mechanism to selectively establish the transmission ratios,
the plurality of shifting mechanisms including at least a first shifting mechanism that includes a first planetary mechanism and a second planetary mechanism,
the transmission mechanism establishing at least
a first shifting path transmitting the rotation from the input body to the output body at one of a first transmission ratio and a second transmission ratio by changing the rotational speed with at least the first shifting mechanism, and
a second shifting path transmitting the rotation from the input body to the output body at a third transmission ratio that is greater than the first and second transmission ratios by changing the rotational speed with one of the plurality of shifting mechanisms differing from the shifting mechanism used to establish the first shifting path,
the first shifting path includes
a first planetary shifting path transmitting the rotation from the input body to the output body at the first transmission ratio by changing the rotational speed with the first planetary mechanism and not with the second planetary mechanism, and
a second planetary shifting path transmitting the rotation from the input body to the output body at the second transmission ratio by changing the rotational speed not with the first planetary mechanism but with the second planetary mechanism, and
the setting mechanism being configured to set the transmission mechanism so that the rotational speed is not changed by the first planetary mechanism in the second shifting path.

2. The bicycle shifting device according to claim 1, wherein
each of the first and second planetary mechanisms is configured to increase the rotational speed transmitted from the input body to the output body.

3. The bicycle shifting device according to claim 1, wherein
the plurality of shifting mechanisms further includes a second shifting mechanism that at least partially establishes the second shifting path,
the second shifting mechanism includes a third planetary mechanism and a fourth planetary mechanism,
the second shifting path includes
a third planetary shifting path transmitting the rotation from the input body to the output body at a third transmission ratio, which is greater than the second transmission ratio, by changing the rotational speed with the third planetary mechanism and not with the fourth planetary mechanism, and
a fourth planetary shifting path transmitting the rotation from the input body to the output body at a fourth transmission ratio, which is greater than the third transmission ratio, by changing the rotational speed not with the third planetary mechanism but with the fourth planetary mechanism, and
the setting mechanism is configured to set the shifting paths so that the rotational speed is not changed by the third planetary mechanism in one of the shifting paths corresponding to a transmission ratio that is greater than the fourth transmission ratio.

4. The bicycle shifting device according to claim 3, wherein
the third planetary mechanism is configured to increase the rotational speed transmitted from the input body to the output body.

5. The bicycle shifting device according to claim 3, wherein
the fourth planetary mechanism is configured to increase the rotational speed transmitted from the input body to the output body.

6. The bicycle shifting device according to claim 3, further comprising a support member supporting the third and fourth planetary mechanisms, the third planetary mechanism including a third sun gear rotatably supported by the support member, a third ring gear arranged around the third sun gear, and a third planetary gear engaging with the third sun gear and revolvable with respect to the third sun gear and the third ring gear, the fourth planetary mechanism including a fourth sun gear rotatably supported by the support member, a fourth ring gear arranged around the fourth sun gear, and a fourth planetary gear engaging with the fourth sun gear and revolvable with respect to the fourth sun gear and the fourth ring gear, the setting mechanism including a third setting member configured to set the third sun gear to one of a rotation state where the third sun gear is rotatable with respect to the support member and a restriction state where the third sun gear is non-rotatable with respect to the support member, and a fourth setting member configured to set the fourth sun gear to one of a rotation state where the fourth sun gear is rotatable with respect to the support member and a restriction state where the fourth sun gear is non-rotatable with respect to the support member, and the setting mechanism being configured to control the third and fourth setting members so that in a case where one of the third and fourth sun gears is in the restriction state, the other one of the third and fourth sun gears is in the rotation state.

7. The bicycle shifting device according to claim 6, wherein the third and fourth planetary gears are integrally formed on a second planetary gear member, and the third and fourth ring gears are integrally formed on a second ring gear member.

8. The bicycle shifting device according to claim 7, wherein the second ring gear member includes a second gear portion that is used as the third and fourth ring gears.

9. The bicycle shifting device according to claim 6, wherein in an operation setting the third sun gear from the restriction state to the rotation state with the third setting member and setting the fourth sun gear from the rotation state to the restriction state with the fourth setting member, the setting mechanism is configured to set the third sun gear from the restriction state to the rotation state with the third setting member after setting the fourth sun gear from the rotation state to the restriction state with the fourth setting member.

10. The bicycle shifting device according to claim 1, further comprising a support member supporting the first and second planetary mechanisms, the first planetary mechanism includes a first sun gear rotatably supported by the support member, a first ring gear arranged around the first sun gear, and a first planetary gear engaging with the first sun gear and revolvable with respect to the first sun gear and the first ring gear, the second planetary mechanism includes a second sun gear rotatably supported by the support member, a second ring gear arranged around the second sun gear, and a second planetary gear engaging with the second sun gear and revolvable with respect to the second sun gear and the second ring gear, the setting mechanism includes a first setting member configured to set the first sun gear to one of a rotation state where the first sun gear is rotatable with respect to the support member and a restriction state where the first sun gear is non-rotatable with respect to the support member, and a second setting member configured to set the second sun gear to one of a rotation state where the second sun gear is rotatable with respect to the support member and a restriction state where the second sun gear is non-rotatable with respect to the support member, and the setting mechanism being configured to control the first and second setting members so that in a case where one of the first and second sun gears is in the restriction state, the other one of the first and second sun gears is in the rotation state.

11. The bicycle shifting device according to claim 10, wherein the first and second planetary gears are integrally formed on a first planetary gear member, and the first and second ring gears are integrally formed on a first ring gear member.

12. The bicycle shifting device according to claim 11, wherein the first ring gear member includes a first gear portion that is used as the first and second ring gears.

13. The bicycle shifting device according to claim 10, wherein in an operation setting the first sun gear from the restriction state to the rotation state with the first setting member and setting the second sun gear from the rotation state to the restriction state with the second setting member, the setting mechanism is configured to set the first sun gear from the restriction state to the rotation state with the first setting member after setting the second sun gear from the rotation state to the restriction state with the second setting member.

14. The bicycle shifting device according to claim 1, wherein the transmission mechanism further forms a non-shifting path transmitting the rotation of the input body to the output body without changing the rotational speed of the input body transmitted to the output body.

15. The bicycle shifting device according to claim 1, further comprising a hub accommodating the transmission mechanism and the setting mechanism.

16. A bicycle assist system comprising the bicycle shifting device according to claim 1; and further comprising a motor assisting human driving force.

17. The bicycle assist system according to claim 16, further comprising an operation portion operatively coupled to the bicycle shifting device, the bicycle shifting device changes a transmission ratio of a bicycle in accordance with manual operation of the operation portion.

18. A bicycle shifting device changing speed of rotation of an input body and transmitting the rotation to an output body, the bicycle shifting device comprising:

a plurality of shifting mechanisms configured to change a rotational speed transmitted from the input body and to the output body;

a transmission mechanism configured to transmit the rotation from the input body to the output body at transmission ratios of at least three steps; and a setting mechanism configured to set a plurality of shifting paths in the transmission mechanism to selectively establish the transmission ratios, each of the plurality of shifting mechanisms including at least one planetary mechanism, the transmission mechanism establishing at least
- a first shifting path transmitting the rotation from the input body to the output body at a first predetermined transmission ratio in the transmission ratios by changing the rotational speed with at least one of the plurality of shifting mechanisms, and
- a second shifting path transmitting the rotation from the input body to the output body at a second predetermined transmission ratio, which is greater than the first predetermined transmission ratio, by changing the rotational speed with one of the plurality of shifting mechanisms differing from the at least one of the plurality of shifting mechanisms used to establish the first shifting path, and in a case where the rotational speed is changed in the second shifting path by the at least one of the plurality of shifting mechanisms used to establish the first shifting path, the setting mechanism is configured to set the transmission mechanism so that rotational speed is changed in one of the shifting paths corresponding to a transmission ratio that is greater than the second predetermined transmission ratio by the at least one of the plurality of shifting mechanisms used to establish the first shifting path.

19. The bicycle shifting device according to claim 18, wherein
the at least one of the plurality of shifting mechanisms used to establish the first shifting path includes a first planetary mechanism and a second planetary mechanism.

20. The bicycle shifting device according to claim 19, wherein
each of the first and second planetary mechanisms is configured to increase the rotational speed transmitted from the input body to the output body.

21. A bicycle shifting device changing speed of rotation of an input body and transmitting the rotation to an output body, the bicycle shifting device comprising:
a shifting mechanism configured to change a rotational speed transmitted from the input body to the output body;
a transmission mechanism configured to transmit the rotation from the input body to the output body at transmission ratios of at least two steps;
a setting mechanism configured to set a shifting path in the transmission mechanism to selectively establish the transmission ratios; and
a support member supporting the shifting mechanism,
the shifting mechanism includes a plurality of transmission bodies supported by the support member so as to be set to one of a rotation state, which allows rotation, and a restriction state, which restricts rotation,
the plurality of transmission bodies includes a first transmission body and a second transmission body,
the shifting path in the transmission mechanism includes
a first path transmitting the rotation from the input body to the output body by changing the rotational speed with the first transmission body, and
a second path transmitting the rotation from the input body to the output body by changing the rotational speed with the second transmission body at one of the transmission ratios that is one step greater than the first path, and in an operation setting the shifting path from the first path to the second path, the setting mechanism being configured to set the first transmission body from the restriction state to the rotation state after setting the second transmission body from the rotation state to the restriction state.

22. The bicycle shifting device according to claim 21, wherein
the shifting mechanism includes a first shifting mechanism that includes a first planetary mechanism and a second planetary mechanism,
the first planetary mechanism includes a first sun gear, which is the first transmission body,
the second planetary mechanism includes a second sun gear, which is the second transmission body,
the setting mechanism includes
a first setting member configured to set the first sun gear to one of the rotation state and the restriction state, and
a second setting member configured to set the second sun gear to one of the rotation state and the restriction state, and
the setting mechanism being configured to control the first and second setting members so that in a case where one of the first and second sun gears is in the restriction state, the other one of the first and second sun gears is in the rotation state.

23. The bicycle shifting device according to claim 21, wherein
the shifting mechanism includes a second shifting mechanism that includes a third planetary mechanism and a fourth planetary mechanism,
the third planetary mechanism includes a third sun gear, which is the first transmission body,
the fourth planetary mechanism includes a fourth sun gear, which is the second transmission body,
the setting mechanism includes
a third setting member configured to set the third sun gear to one of the rotation state and the restriction state, and
a fourth setting member configured to set the fourth sun gear to one of the rotation state and the restriction state, and
the setting mechanism being configured to control the third and fourth setting members so that in a case where one of the third and fourth sun gear is in the restriction state, the other one of the third and fourth sun gears is in the rotation state.

24. The bicycle shifting device according to claim 21, wherein
the setting mechanism includes a pawl member that is arranged around the support member to be engageable with an inner circumferential portion of the first transmission body.

25. The bicycle shifting device according to claim 24, wherein
the inner circumferential portion of the first transmission body has a groove, and the pawl member is configured to fit into the groove.

26. The bicycle shifting device according to claim 24, wherein the setting mechanism is configured to set the first transmission body from the restriction state to the rotation state in a state where torque acting between the pawl member and the first transmission body is less than or equal to a predetermined value.

27. The bicycle shifting device according to claim 26, wherein the predetermined value is 15 Nm.

\* \* \* \* \*